United States Patent
Rausch et al.

(10) Patent No.: US 7,172,249 B2
(45) Date of Patent: Feb. 6, 2007

(54) MOTOR VEHICLE SEAT

(75) Inventors: Peter Rausch, Niederfüllbach (DE); Christina Schwerdtner, Neustadt (DE); Wolfgang Suck, Coburg (DE); Andrea Bauersachs, Ebersdorf (DE); Reinhard Escher, Lautertal (DE); Werner Tsubmann, Lautertal (DE)

(73) Assignee: Brose Fahrzeugteile GmbH & Co. KG Coburg, Coburg (DE)

( * ) Notice: Subject to any disclaimer, the term of this patent is extended or adjusted under 35 U.S.C. 154(b) by 362 days.

(21) Appl. No.: 10/479,305

(22) PCT Filed: May 22, 2002

(86) PCT No.: PCT/DE02/01908

§ 371 (c)(1), (2), (4) Date: Nov. 25, 2003

(87) PCT Pub. No.: WO02/094604

PCT Pub. Date: Nov. 28, 2002

(65) Prior Publication Data

US 2004/0169409 A1  Sep. 2, 2004

(30) Foreign Application Priority Data

May 25, 2001 (DE) ............... 101 27 151
May 25, 2001 (DE) ............... 101 27 152

(51) Int. Cl.
*B60N 2/02* (2006.01)

(52) U.S. Cl. .................................. 297/341

(58) Field of Classification Search ............ 297/341, 297/378.1
See application file for complete search history.

(56) References Cited

U.S. PATENT DOCUMENTS 5,855,413 A  1/1999  Couasnon et al.

(Continued)

FOREIGN PATENT DOCUMENTS

DE  299 10 720 U1  9/1999

(Continued)

OTHER PUBLICATIONS

International Search Report of PCT/DE02/01908, dated Nov. 18, 2002.

(Continued)

*Primary Examiner*—Milton Nelson, Jr.
(74) *Attorney, Agent, or Firm*—Christie, Parker & Hale, LLP.

(57) ABSTRACT

A motor vehicle seat. The seat has a seat frame; a seat back pivotally mounted on the seat frame and which can be tilted forward out of its position of use and toward a seat surface of the seat frame; a longitudinal guide with which the seat frame is displaceable in the longitudinal direction of the seat in order to adjust the longitudinal position of the seat; a fixing device for fixing the seat frame in a previously adjusted longitudinal position of the seat, an actuating element for releasing the fixing device thereby enabling the seat frame to be displaced in the longitudinal direction of the seat, a coupling mechanism, which acts upon the actuating element and releases the fixing device when the seat back is tilted forward toward the seat surface, and a memory device by means of which the seat frame can be automatically held in a preset longitudinal position of the seat, which is defined as a memory position.

42 Claims, 15 Drawing Sheets

| U.S. PATENT DOCUMENTS | | | |
|---|---|---|---|
| 6,227,596 B1 | 5/2001 | Foucault et al. | |

FOREIGN PATENT DOCUMENTS

| FR | 2 756 522 A1 | 6/1998 |
|---|---|---|
| WO | WO 00/55002 | 9/2000 |

OTHER PUBLICATIONS

International Preliminary Examination Report of PCT/DE02/01908, dated Aug. 5, 2003.

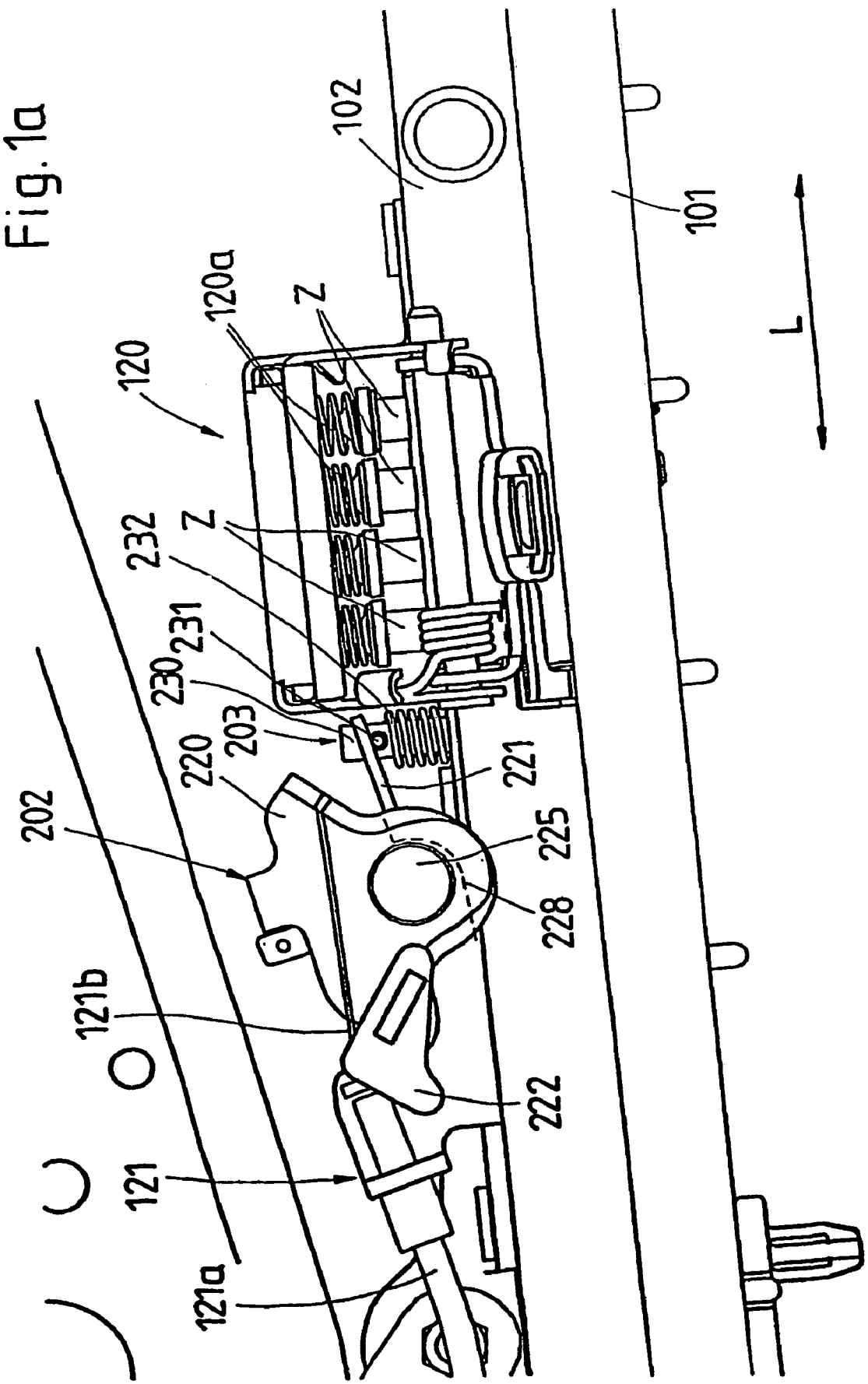

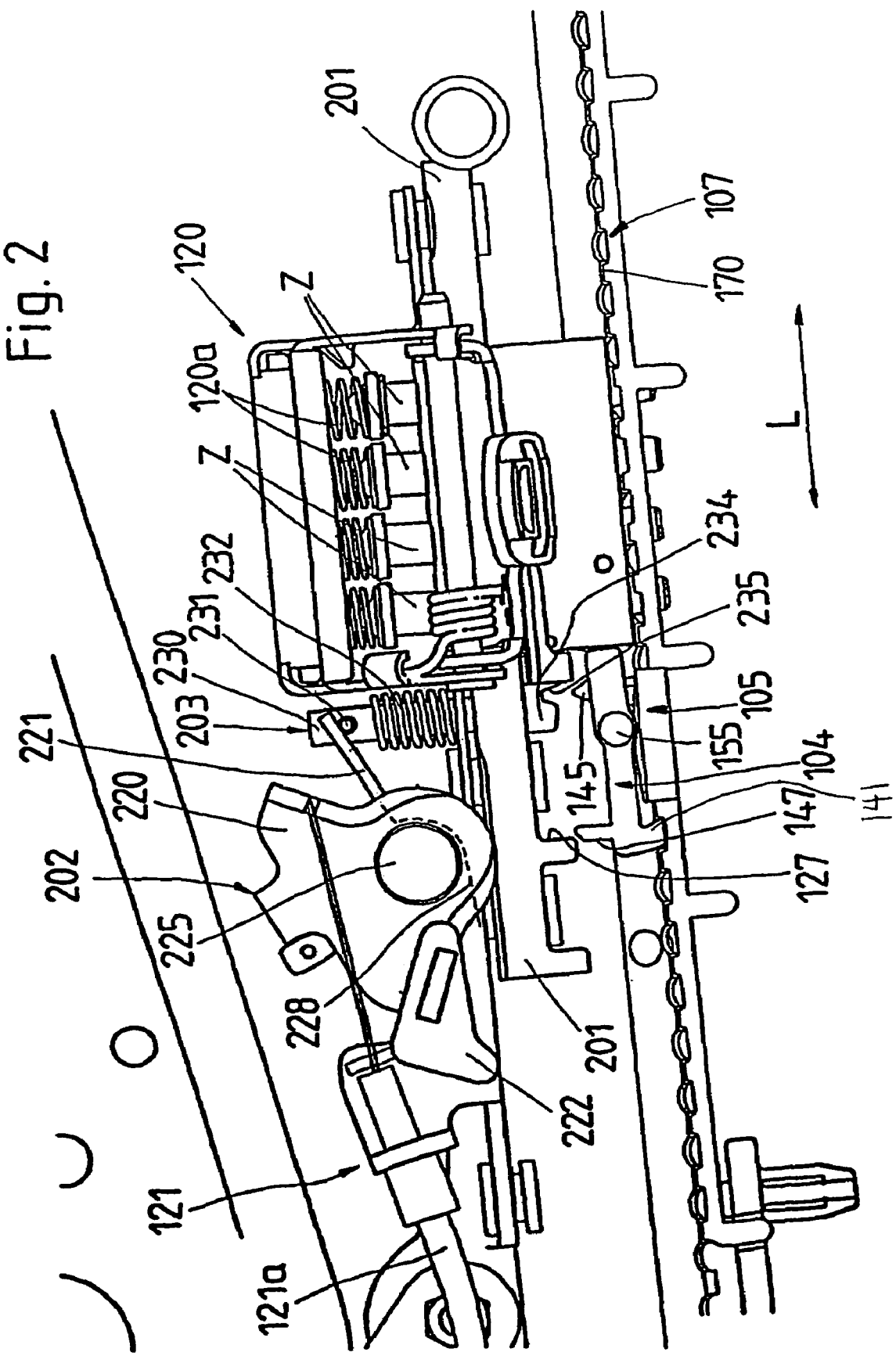

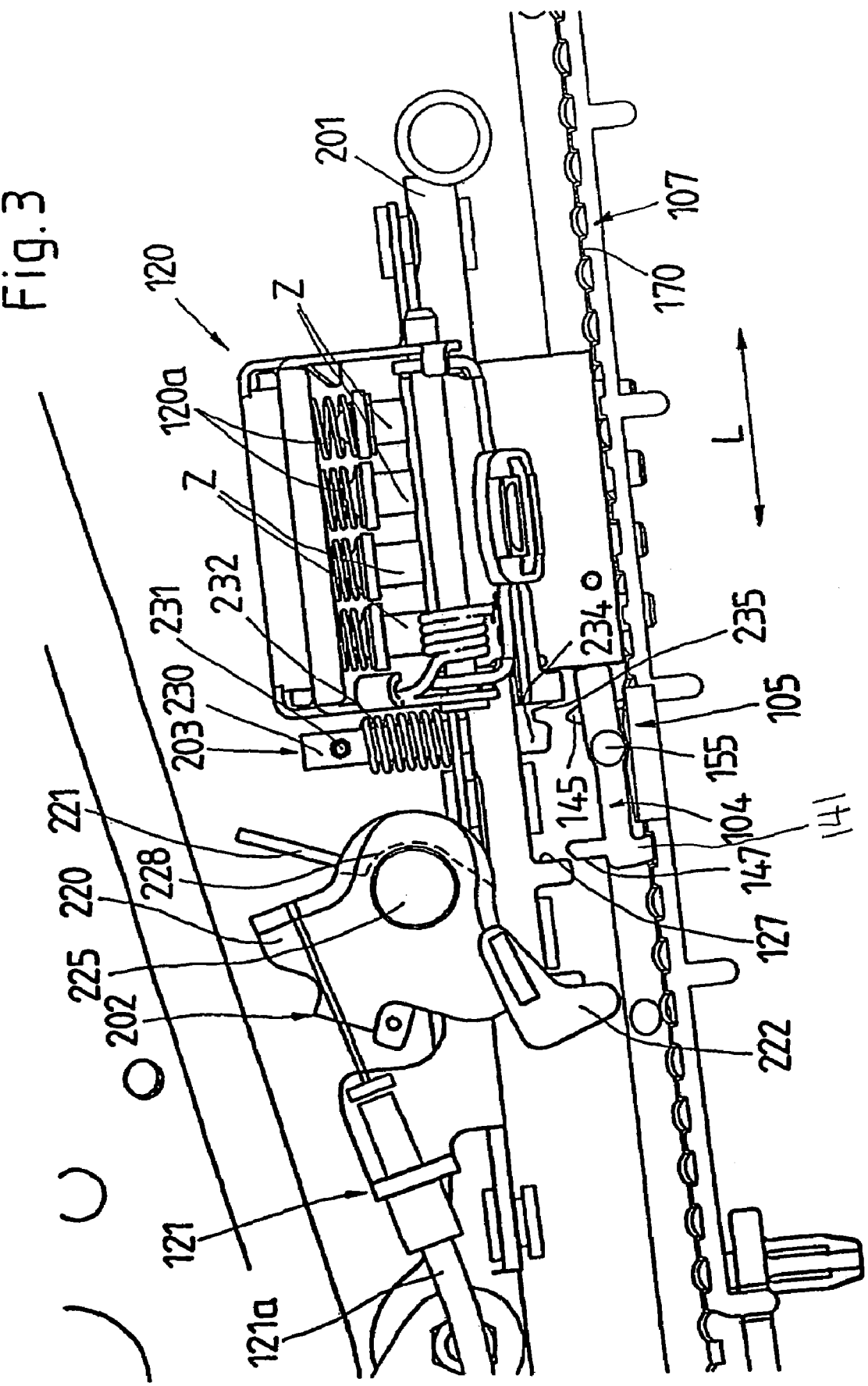

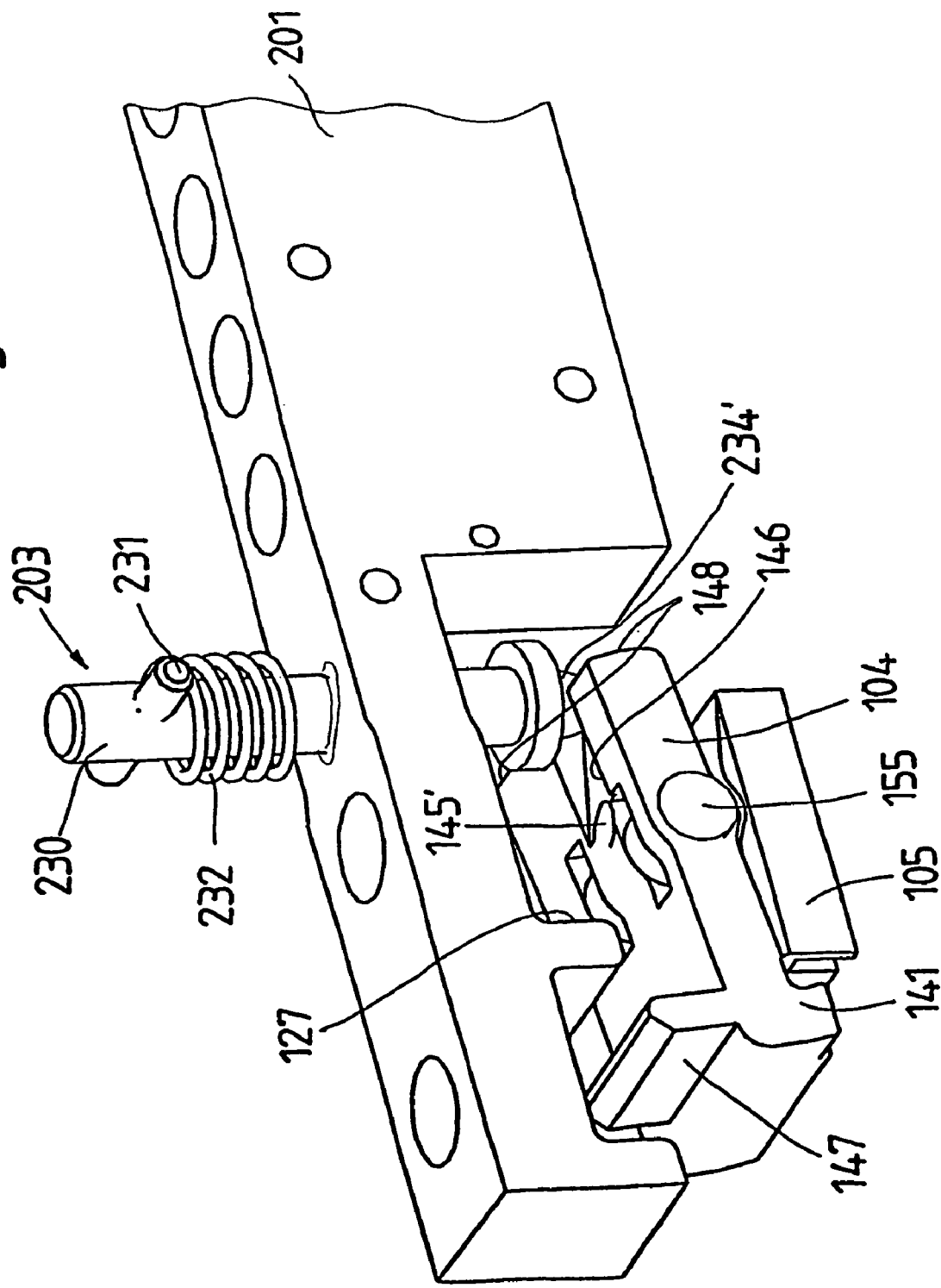

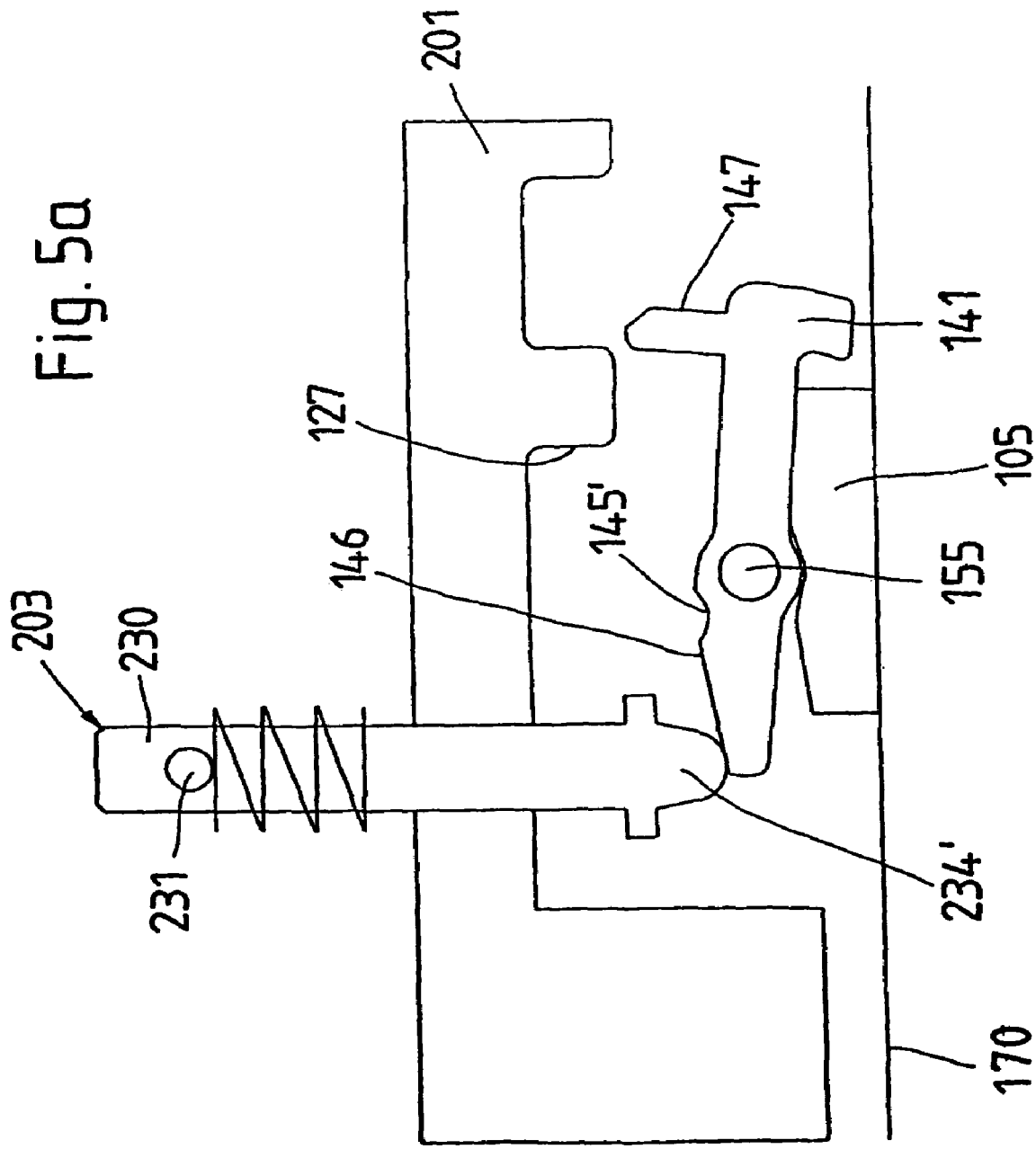

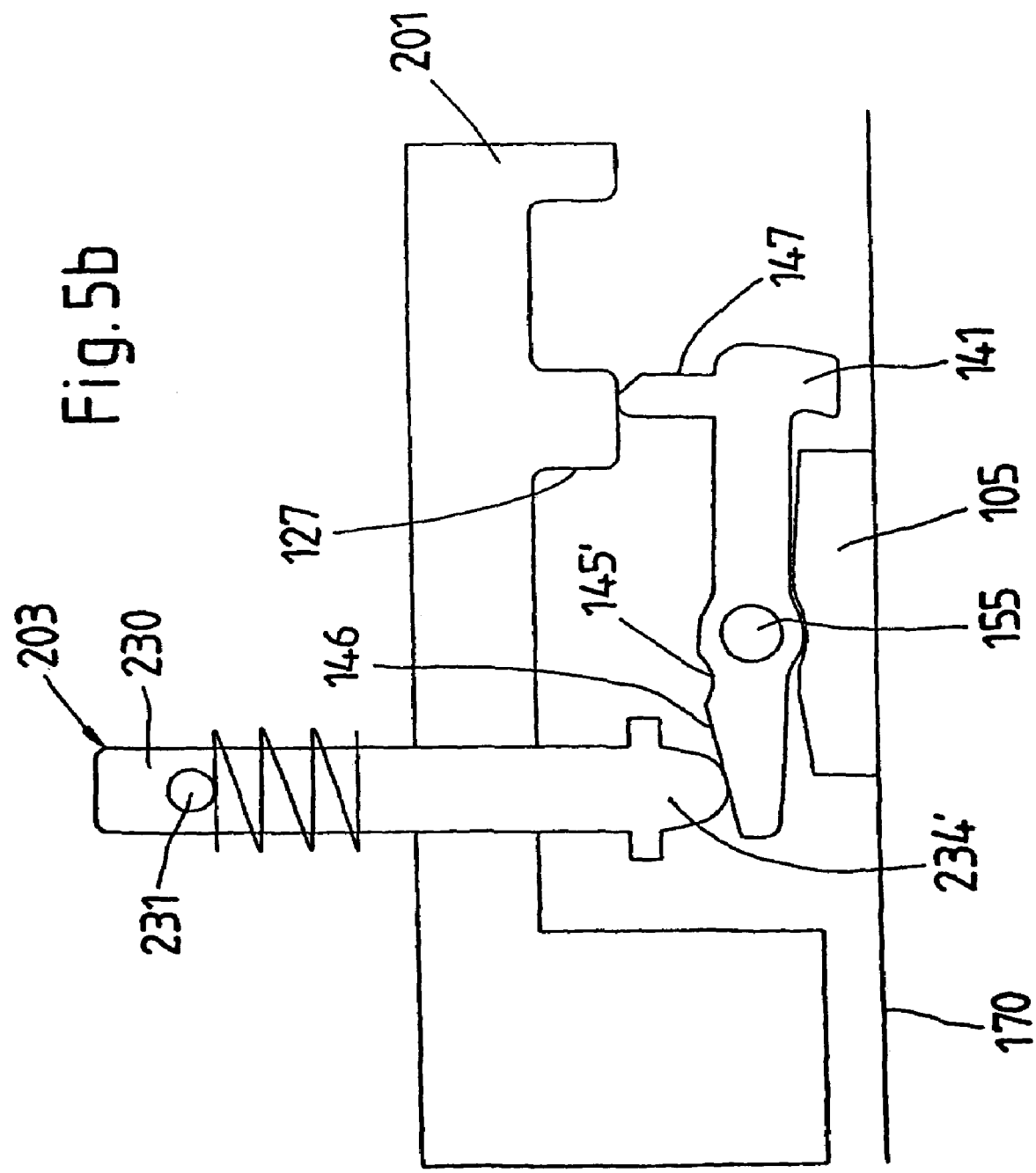

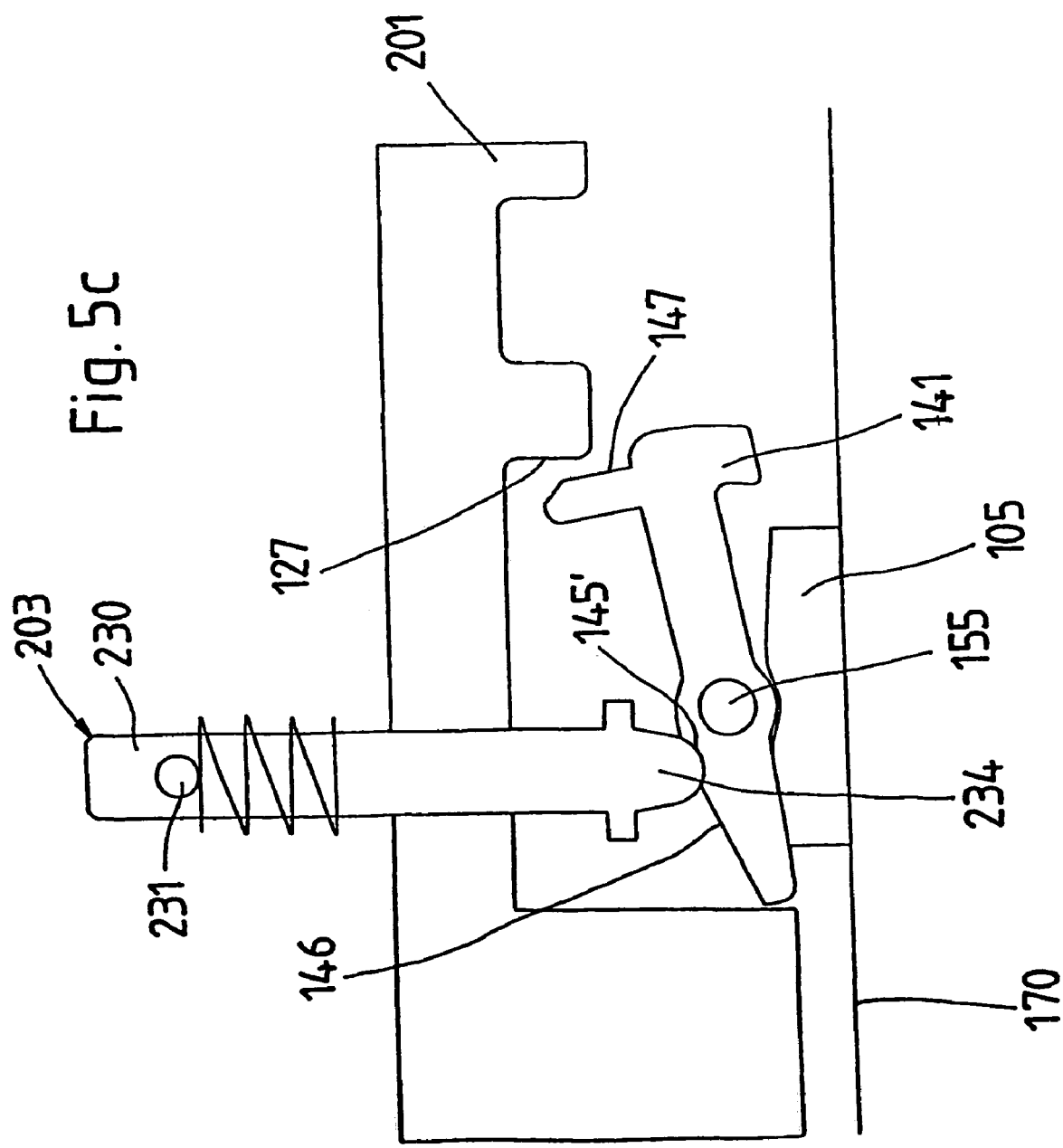

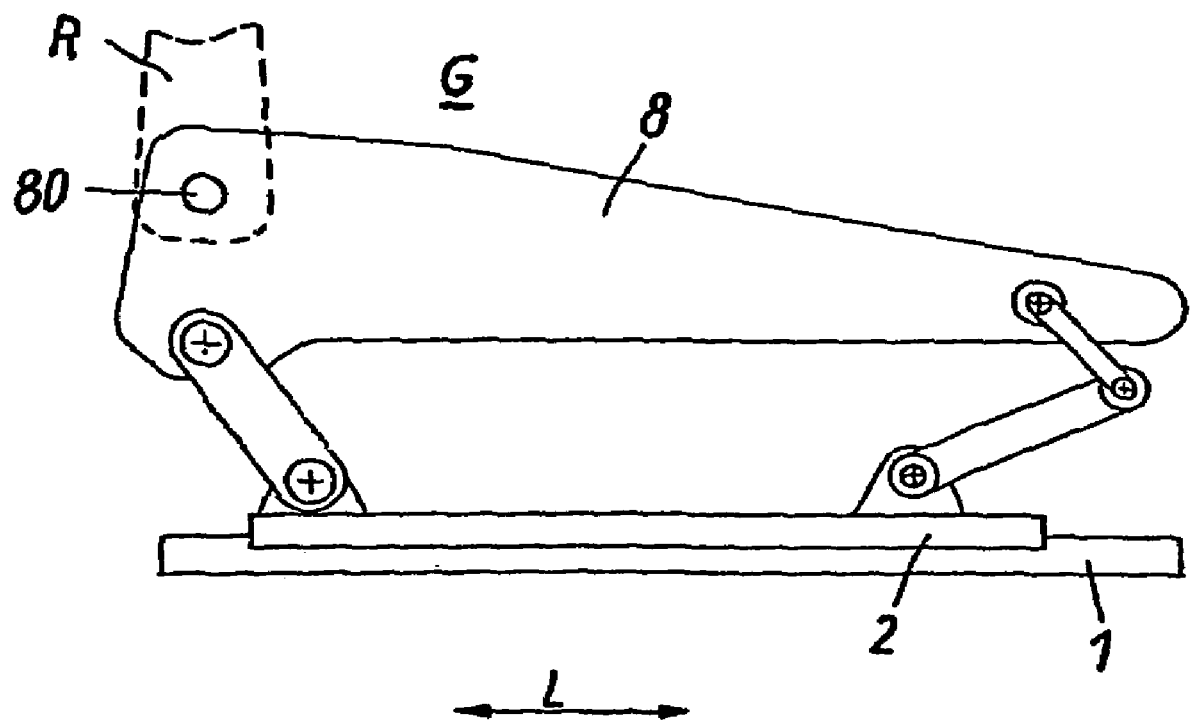

MOTOR VEHICLE SEAT

REFERENCE TO RELATED APPLICATION(S)

This application is a National Phase Patent Application of International Application Number PCT/DE02/01908, filed on May 22, 2002, which claims priority of German Patent Application Number 101 27 151.4, filed on May 25, 2001, and German Patent Application Number 101 27 152.2, filed on May 25, 2001.

BACKGROUND

The invention relates to a motor vehicle seat.

The motor vehicle seat comprises, for example, a seat frame, a seat surface provided on the seat frame, and a backrest which is mounted pivotally on the seat frame and which can be tilted forwards towards the seat surface.

Seats of this kind are used as front seats in motor vehicles where folding the backrest forwards makes it easier for a passenger to enter the back of the vehicle or to place objects in the back of the vehicle. An additional easy entry function which is particularly of importance in two-door vehicles, is achieved if the seat can be moved forwards after folding the backrest forwards. For this purpose, the vehicle seat has the following:

- a longitudinal guide with which the seat frame can be moved to adjust the longitudinal position of the seat in the longitudinal direction of the seat;
- a fixing device for locking the seat frame in a previously set longitudinal position;
- an actuating element for releasing the fixing device so that the seat frame can be moved in the longitudinal direction of the seat;
- a coupling mechanism for coupling the fixing device to, the backrest which acts on the actuating element and thereby releases the fixing device when the seat back has been tilted forwards to the seat surface;
- a memory device with which the seat frame on moving in the seat longitudinal direction can be stopped automatically in a predeterminable seat longitudinal position defined as the memory position whereby a stop which is associated with the seat frame and which can be moved in the seat longitudinal direction moves into engagement with a counter stop of the memory device;
- an adjusting device of the memory device with which the memory position is setable by sliding the position of the counter stop in the seat longitudinal direction;
- a locking device for the memory device for locking a set memory position and
- a switch device by which the locking device is releasable in order to adjust the memory position.

A seat of this kind known from WO 00/55002 (see corresponding U.S. Pat. No. 6,631,952) on the one hand provides the possibility of, after tilting the back rest forwards towards the seat surface, sliding the seat frame and thus the entire vehicle seat forwards to enable the passenger to climb into the back (easy-entry function). At the same time the seat can then be moved very simply again into its original seat longitudinal position if this longitudinal position is stored as the memory position by means of the memory device provided for this purpose. In this case when sliding back the seat the seat frame is automatically stopped in the memory position whereby a stop associated with the seat frame interacts with a counter stop of the memory device.

By "useful position" of the seat back is meant herein to be a position in which the seat back has an incline relative to the substantially horizontal seat surface which enables the back of a person on the seat to be supported. To implement the easy entry function the seat has to be tilted forwards from such useful position towards the seat surface.

The term "seat frame" herein means all the elements of the seat which can be moved by means of the longitudinal guide in the seat longitudinal direction, and thus also the parts of the longitudinal guide itself which can be moved in the longitudinal direction of the seat.

SUMMARY

An object of the invention is therefore to improve a vehicle seat of the type mentioned at the beginning, and more particularly in respect to reliably storing the actual seat position as a memory position when folding the seat back forwards and as regards subsequently arriving at the stored memory position when the backrest is located in its useful position, thus raised up.

The backrest is coupled to the fixing device on one side and to the locking device on the other side, so that when tilting the backrest towards the seat surface first by means of the locking device the actual seat longitudinal position is locked as the memory position and only then is the fixing device released.

It is hereby ensured that when implementing the easy-entry function a movement of the seat frame in the seat longitudinal direction from the actual seat position is only possible after the actual seat position has previously been stored as the memory position.

In a preferred embodiment of the invention, the coupling mechanism, which acts on the actuating element and releases the fixing device when the backrest is folded forwards towards the seat surface, as well as the means through which the locking device is coupled to the backrest, form a multi-stage acting loading and release kinematic unit which acts on one side on the fixing device and on the other side on the locking device in order to actuate same in at least two stages. Thereby, in a first stage, the actual seat longitudinal position is locked as a memory position by means of the locking device, and in a second stage, the fixing device can be released.

According to a variation of the invention, the coupling mechanism only acts on the actuating element in order to release the fixing device after the actual seat longitudinal position has been locked as a memory position by means of the locking device.

According to another variation of the invention, the coupling mechanism acts already on the actuating element in order to release the fixing device before the actual seat longitudinal position has been locked as a memory position by means of the locking device, and the release of the fixing device is only active after the actual seat longitudinal position has been locked as a memory position by means of the locking device.

The invention provides an arrangement for actuating the memory device by means of which first the actual seat longitudinal position can be locked as memory position before the fixing device of the seat longitudinal guide is then released. According to this, a follower is provided which is mounted to be movable (preferably on the seat frame) and which, with the backrest located in the useful position, is held by a locking element in a position in which it—in the memory position of the seat or seat frame—acts on the memory device so that with an adjustment of the seat longitudinal position the memory position can be adjusted together with the seat frame whereby the follower is preferably coupled to a resetting spring which lifts the follower from the memory device when the backrest is tilted forwards.

The follower when acting on the memory device releases its locking device and further enables resetting of the memory position when moving the seat.

In order to allow the follower to lift from the memory device when the backrest is tilted forwards, the locking element when folding the backrest forwards releases the follower by lifting off away from the follower. The memory device and its locking device can then move into the locked state so that when tilting the backrest forward, with the aim of implementing the easy-entry function, the actual seat position is automatically stored by means of the memory device.

This arrangement enables, on the one hand, a very compact construction of the structural groups provided for providing an easy-entry function, as will be apparent from the description below of embodiments in connection with the drawings. On the other hand, it can be ensured in simple manner that when approaching the memory position—depending on requirements—the seat is stopped selectively in the memory position or moves over the memory position and sets this again at the same time.

In a preferred embodiment of the invention, when the backrest is tilted forwards, the follower lifts away from the memory device before the fixing device of the seat longitudinal guide coupled to the backrest is released. It is hereby ensured that the actual seat position is stored by means of the memory device before the seat longitudinal adjustment can start after release of the fixing device.

This is achieved, in particular, in that when folding the backrest forwards about a first angle from its useful position, the follower is lifted from the memory device, and that when tilting the backrest further forwards the fixing device is released. The absolute value of the aforementioned angle thereby depends on which incline the backrest has previously in the useful position. Alternatively, the two angles can also be defined relative to the vertical (i.e. to the vertically aligned backrest). Decisive in each case is that the angle about which the backrest has to be pivoted when folding forwards until the fixing device is released is absolutely greater than the angle about which the backrest has to be folded forwards as a whole until the follower lifts from the memory device.

According to one embodiment of the invention, the locking element is elastically pretensioned towards the follower, whereby the pretension with which the locking element acts on the follower is greater than the resetting action of the resetting spring coupled to the follower. The locking element can thereby hold the follower against the action of the resetting spring in a position in which the follower acts on the memory device so that this is unlocked so that during adjustment of the seat from the memory position with the backrest located in the useful position the memory position is adjusted anew.

On the other hand, the locking element must be coupled to the backrest so that when folding the backrest forwards the locking element is lifted from the follower. A traction member such as in particular the core of a Bowden cable can be used to couple the locking element to the backrest.

The locking element is preferably pivotally mounted and provided on a lever which has at the same time an actuating section for releasing the fixing device of the seat longitudinal guide.

The follower in turn is preferably mounted longitudinally displaceable and designed so that it can positively act on the memory device in order to actuate, during adjustment of the seat longitudinal position (with the backrest in the useful position, i.e. with the memory device released), a new setting of the memory position at the same time.

If the seat is located outside of its memory position, then the follower is spaced in the seat longitudinal direction from the memory device so that the locking device of the memory device can readily occupy its locked state. For this the locking device is preferably pretensioned in the direction of the locked state.

On approaching the memory position with the backrest in the useful position the follower preferably acts on the memory device so that its locking device is released. It is thereby ensured that the memory position during adjustment of the seat with the backrest raised up (i.e. in particular whilst a vehicle occupant is located on the corresponding seat) can be readily set again.

Conversely, the follower when the backrest is tilted forwards under the action of its resetting spring, is located in a position in which it does not act on the memory device so that on approaching the memory position with the backrest tilted forwards (i.e. when implementing the easy-entry function), the seat is stopped in the memory position so that the seat position existing before executing the easy-entry function is automatically found once more.

In order to facilitate approaching the memory position and releasing the memory device when the backrest is in the useful position, the memory device preferably has a ramp with which the follower on approaching the memory position enters into active connection, i.e. by the follower sliding on the ramp into the memory position.

Thus, a hold down member mounted movable (preferably on the seat frame) is provided, which in the memory position of the seat and with the backrest located in the useful position (raised up), acts on the memory device so that its locking device is released, and a ramp is provided (movable together with the locking device in the seat longitudinal direction) with which the hold down member on approaching the memory position with the backrest in the useful position enters into active connection whereby it moves along and on same.

The hold down member, when acting on the memory device, releases the locking device and can then furthermore serve as follower, which enables a new setting of the memory position on displacing the seat (with the backrest raised up), thus particularly in a case where the seat is moved together with the vehicle occupant seated thereon to adjust the seat longitudinal position.

The ramp provided according to the invention enables, on approaching the memory position with the backrest raised up in the useful position, an automatic release, and if required, entrainment of the locking device of the memory device in that the hold down member is moved by means of the ramp deliberately into a position in which it acts on the locking device so that this is released. As a result when displacing the seat with the backrest raised up an automatic new setting of the memory position can take place.

In particular, the solution according to the invention makes it possible to use a longitudinally displaceable but non-pivotal hold down member (mounted rigid transversely to its direction of displacement) for releasing the locking device. Preferably the follower is mounted movable along a straight line, namely the vertical vehicle axis (thus in particular perpendicular to the seat longitudinal direction). The hold down member can be guided by means of the ramp on approaching the memory position so that pivoting is not required.

The hold down member can on approaching the memory position slide on the ramp or be moved by rollers or wheels on the ramp.

According to one embodiment of the invention, the movably mounted hold down member is mounted spring elastic in its direction of movement so that it can travel over the ramp (inclined in the seat longitudinal direction). Alternatively, the hold down member is movable on elastic wheels or rollers along the ramp.

The locking device of the memory device has a locking unit, which is displaceable in the seat longitudinal direction and which defines at the same time the memory position, whereby the locking unit has an associated detent device which has detent points arranged in succession in the longitudinal direction of the seat where the locking unit can be locked relative to the detent device. The locking unit itself comprises a pivotally mounted locking pawl which has a catch element which can engage in the detent device at the different detent points. The hold down member acts on the locking pawl to release this locking device.

The ramp is in this case preferably formed on the pivotally mounted locking pawl of the locking unit so that on travelling over the ramp the locking pawl is pivoted increasingly by the hold down member and the locking device is released. The ramp thereby makes it possible in particular for the follower to move up onto the locking pawl on approaching the memory position.

The ramp thereby extends across the seat longitudinal direction only over a part of the width of the locking pawl so that the adjoining regions can act as a stop.

In a further development of the invention, a stop is provided on the locking device, more particularly on the locking pawl and on approaching the memory position interacts with a stop on the seat frame side (connected to the seat longitudinal guide) so that release of the locking device is blocked until the seat frame has reached the memory position.

The hold down member preferably serves at the same time as a follower which, in the memory position of the seat and with the backrest in the useful position, acts on the memory device so that the memory position when adjusting the seat longitudinal position is adjusted together with the seat frame. No separate additional follower is then required for adjusting the memory position when displacing the seat.

The hold down member can then, when the backrest is raised up, be held in the position by means of a locking element in which it releases the locking device and can furthermore be coupled to a resetting device, more particularly a resetting spring which, when the backrest is folded forwards, lifts the follower from the memory device.

With a locking device having a locking unit, which can be displaced in the seat longitudinal direction and which in the locked state defines the memory position and which is associated with a detent catch device which comprises detent points arranged in succession in the seat longitudinal direction on which the locking unit can lock relative to the detent device, and with a locking pawl pivotally mounted on the locking unit and provided with a detent element which can engage in the detent device at the said detent points, the follower preferably acts on the memory device through the locking pawl.

A stop can be provided on the locking pawl on which the follower acts when the backrest is located in its useful position so that the locking unit when adjusting the seat longitudinal position can be entrained with the backrest raised up. The stop can also be formed by an indent in the locking pawl in which the follower engages which is displaceable together with the seat frame in the seat longitudinal direction.

Fixing the memory position by means of the locking device is generally not carried out steplessly, i.e. infinitely, but a number of detent points are provided at each of which the memory device can be locked and thus the memory position fixed. This can lead to problems if the seat longitudinal adjustment enables at the same time an infinite adjustment of the seat longitudinal position. For it regularly happens that a seat user moves the seat into a seat longitudinal position and would like to lock it there where a locking of the (non-stepless) memory device is not possible. In such a case it must be ensured that after triggering the easy-entry function (by folding the backrest forwards towards the seat surface) from a position in which the memory device is not locked because the actually set seat longitudinal position was not associated with any suitable detent point of the locking device, this locking can be repeated. For this according to the invention, the memory device has a stop which in the non-locked state of the memory device interacts with an associated stop of the seat frame (which can be provided for example on the seat-side rail of the longitudinal guide) so that the parts of the memory device movable in the seat longitudinal direction are first entrained on sliding the seat forward with the backrest tilted forwards until the locking device of the memory device catches on the next detent point and is thereby locked. With this locking or engagement of the locking device the corresponding stop is moved so that it is no longer in engagement with the associated stop on the side frame side. The seat frame can then be moved further in the seat longitudinal direction whereby the memory device remains in the previously locked memory position.

The solution according to the invention enables a very compact arrangement of all the structural groups which ensure the easy-entry function, including the memory device and the fixing device for the seat longitudinal adjustment. In particular the memory device can hereby be arranged completely within the space enclosed by the rails of the longitudinal guide.

BRIEF DESCRIPTION OF THE DRAWINGS

Further features and advantages of the invention will now be explained with reference to the embodiment illustrated in the drawings:

FIG. 1a is a perspective view of parts of a seat frame with a seat longitudinal guide, with a fixing device of the seat longitudinal guide as well as with a programmable memory device for automatically locating a predetermined seat longitudinal position, in a state in which the back rest of the corresponding seat is located in its useful position;

FIG. 2 is a view according to FIG. 1b in which the backrest of the seat has been folded further forwards from its useful position;

FIG. 3 is a further view according to FIG. 1b in which the backrest of the seat has been folded right onto the associated seat surface;

FIG. 4 is a modification of the memory device of FIGS. 1a to 3;

FIGS. 5a to 5c are views of the memory device of FIG. 4 in different phases when approaching the memory position of a seat, whose backrest is located in its useful position;

FIG. 11 is a diagrammatic view of a seat frame.

DETAILED DESCRIPTION

Figure 1B:
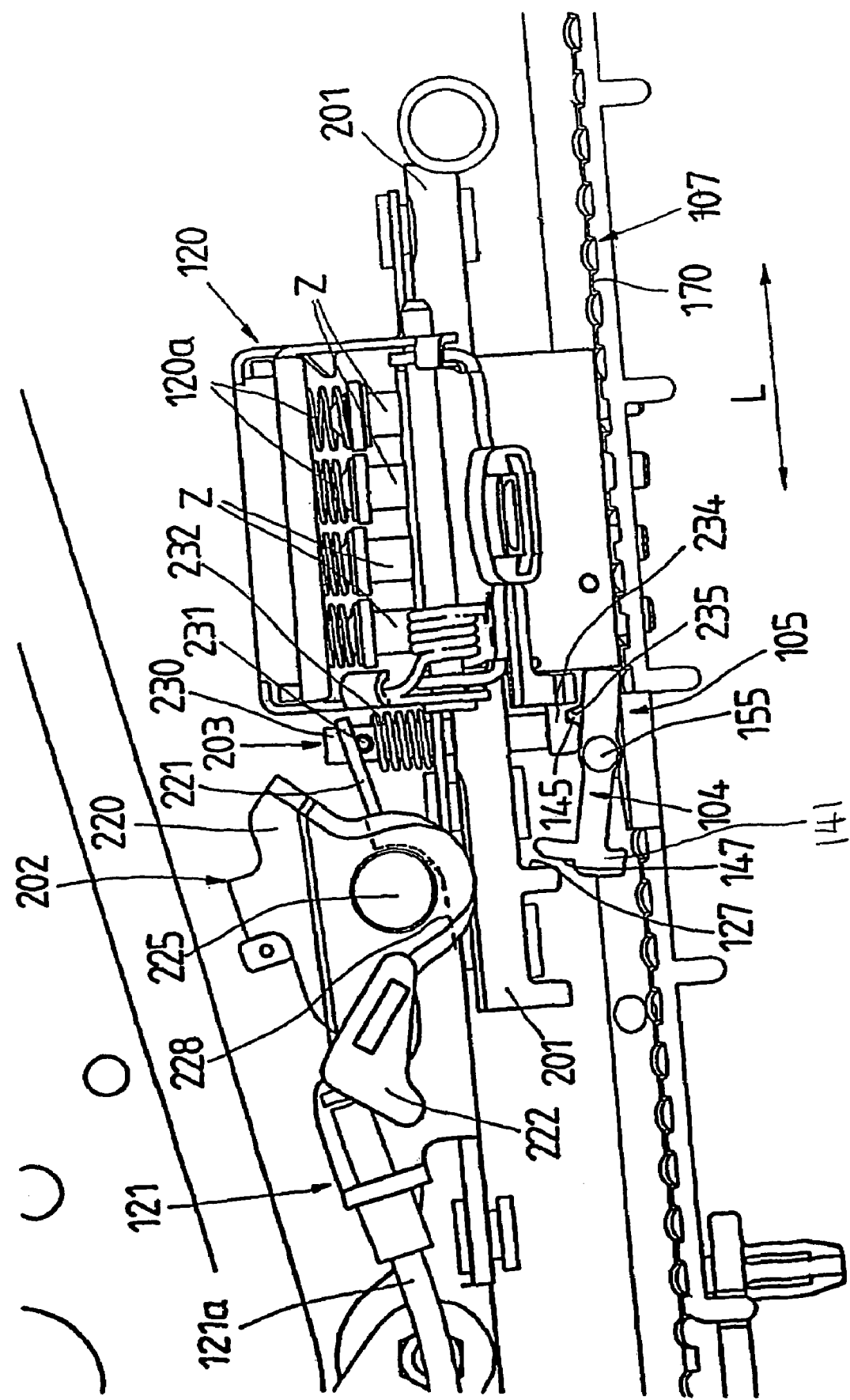
FIG. 1b is a view according to FIG. 1a, in which the rails of the seat longitudinal guide are not shown.

The seat frame G (seat lower frame) illustrated in side view in FIG. 11 comprises a seat rail 2 which is mounted movable in the seat longitudinal direction L on a lower rail 1 which is to be fixed on the vehicle body, and a seat side part 8 which is attached height adjustably on the seat rail 2 through front and rear articulated levers. The seat lower frame G has a corresponding arrangement on its other longitudinal side which cannot be seen in FIG. 11.

Extending between the two seat side parts of the seat frame G is a seat surface which holds a seat cushion on which the vehicle occupant can sit.

Furthermore the side parts 8 of the seat frame G each have a bearing point 80 for pivotally mounting a backrest R which is shown in dotted lines in FIG. 11.

Here, parts of the seat frame are to mean all those component parts which are movable in the longitudinal direction of the seat on the lower rail 1 which is fixed on the body, thus in particular the seat rail 2, the seat side part 8 and the further component parts of the seat connected thereto.

If a vehicle seat of this kind which is displaceable in the longitudinal direction L is used for a two-door vehicle then it is known in order to make entry easier into the back of the vehicle to couple the backrest to the seat longitudinal adjuster, namely so that when tilting the backrest R forwards towards the seat surface which extends between the seat side parts 8 a fixing device associated with the seat longitudinal guide 1, 2 is released and the seat can be moved forwards with the backrest tilted forwards. This is the so-called easy-entry function.

In the following, there is first an explanation, using a seat assembly known from WO 00/55002 (see corresponding U.S. Pat. No. 6,631,952 and illustrated in FIGS. 6 to 10, of the basic principle of the easy-entry function when using a programmable memory device for automatically locating a predeterminable seat longitudinal position. For further details on this reference is made to WO 00/55002 (see corresponding U.S. Pat. No. 6,631,952) which in this respect is an explicit part of the present specification.

Figure 6:
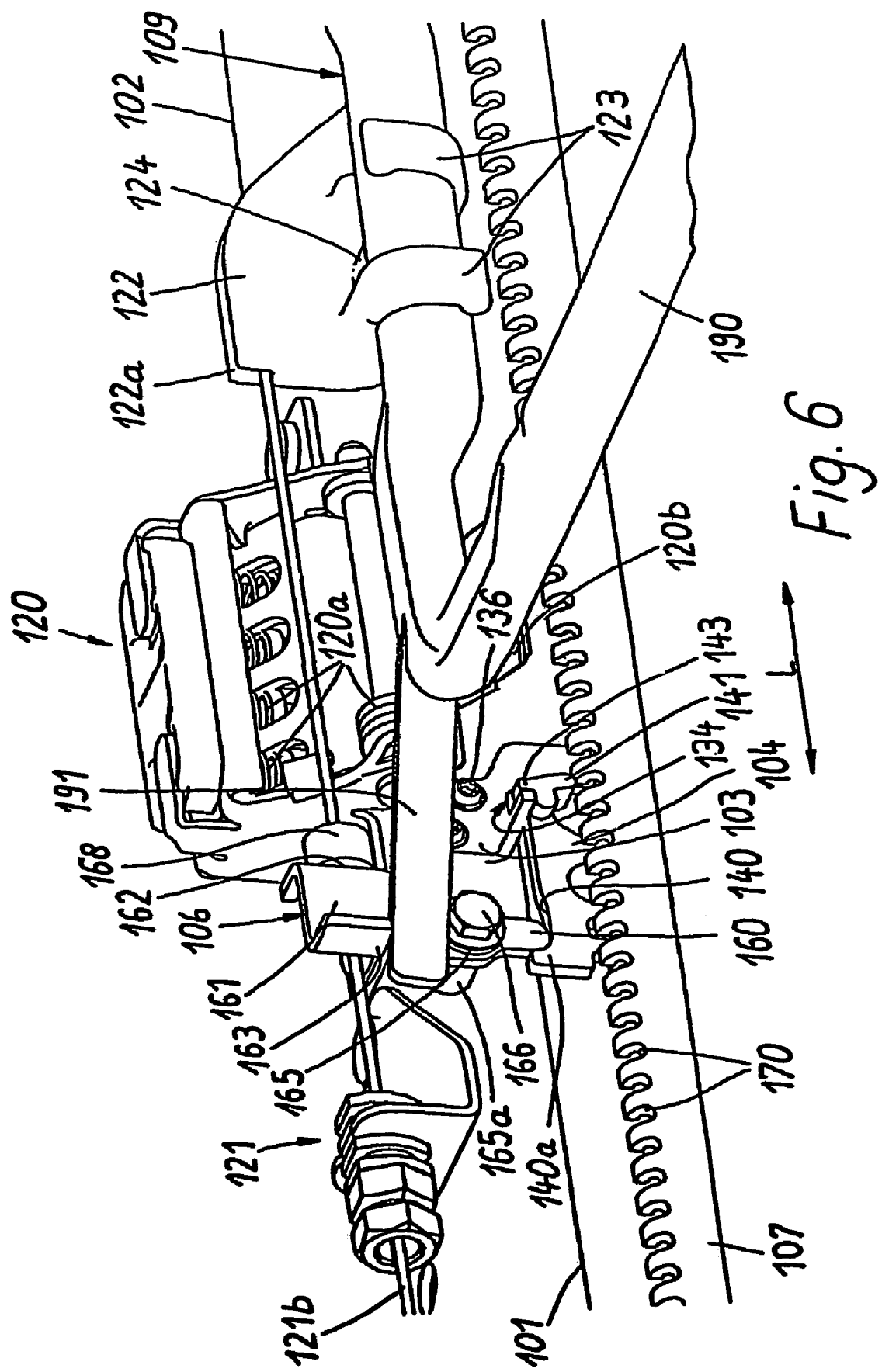
FIG. 6 is a perspective view of a seat frame known from the prior art in a state in which the seat is locked with its backrest raised up in its memory position.
Figure 6A:
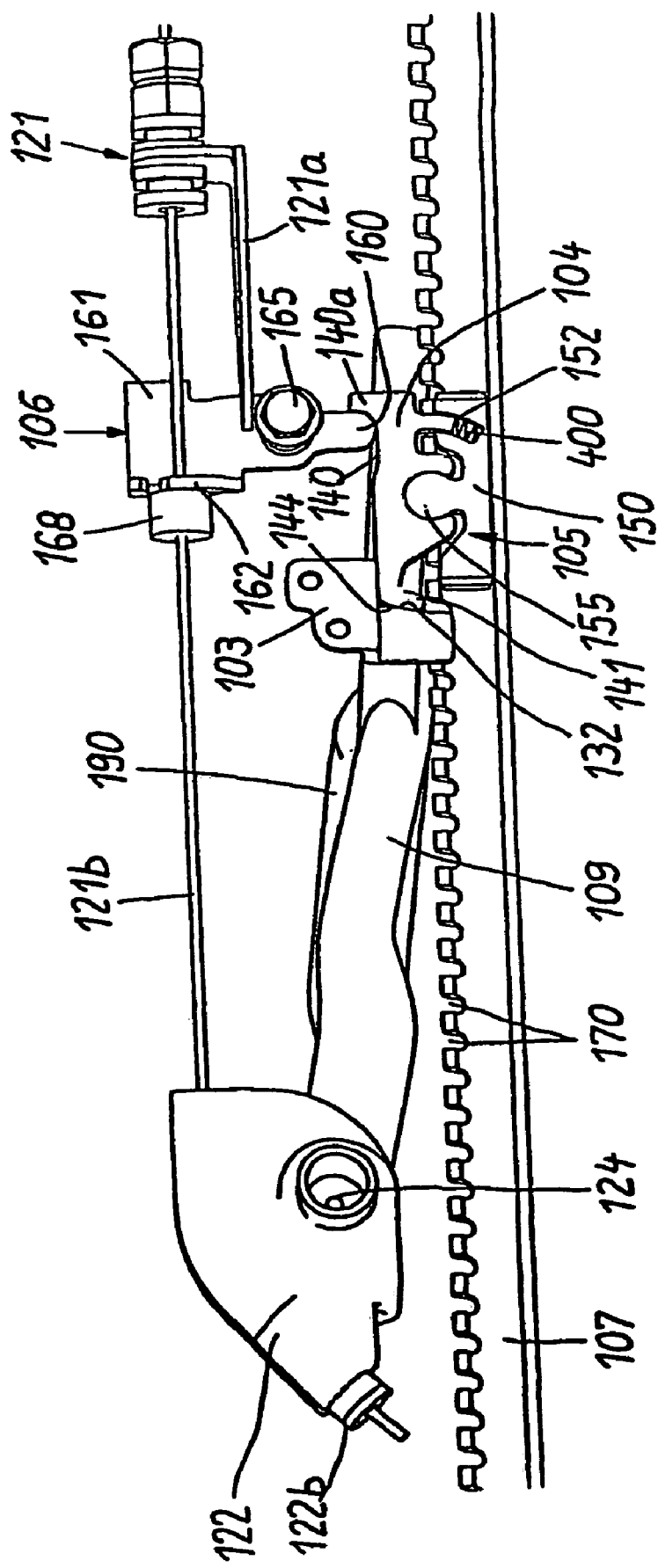
FIG. 6a is a rear view of FIG. 6.

In the perspective front view according to FIG. 6 and the associated rear view according to FIG. 6a can be seen a rail 101 fixed on the body and a seat rail 102 movable thereon in the seat longitudinal direction L whereby the rail 101 fixed on the body is provided with a fixed ratchet rail 107 having several ratchet openings 170 arranged in succession in the seat longitudinal direction L. The seat rail 102 supports the remaining components of the seat frame, see FIG. 11.

The seat rail 102 is lockable relative to the rail 101 fixed on the body by means of a fixing device 120. This can be a conventional fixing device for a seat longitudinal adjuster. In FIGS. 6 and 6a the housing, a pivotally mounted actuating element 120b and a torsion spring (shown in FIG. 7) of a known fixing device 120 acting on the actuating element 120b are shown, with the housing fixed on the seat rail 102. A torsion spring (not shown) serves inter alia to remove play from the assembly to prevent rattling noises.

This fixing device 120 comprises by way of example according to DE 299 10 720 U1 a number of locking teeth arranged inside the housing and pretensioned—by means of springs mounted in the form of coil springs in the housing—elastically towards a detent device fixed on the rail 101 on the side of the body, but not shown in FIGS. 6 and 6a. As a result of the pretension acting on the locking teeth the locking teeth which are associated with the seat rail 102 automatically engage in the detent device fixed on the body so that the seat longitudinal adjustment is locked unless the locking teeth are disengaged from the detent device by means of the actuating element 120b provided for this purpose (see FIG. 7).

Since the actuating element 120b (FIG. 7) of the fixing device 120 is pretensioned by means of the spring assembly 120a which consists of the springs mounted inside the housing and acting on the locking teeth, and the torsion spring mounted outside of the housing (not shown), against the direction in which it has to be swivelled for releasing the fixing device 120, the fixing device 120 can only then be released if a force is exerted on the actuating element 120b against the action of the spring assembly 120a.

In order to release the fixing device 120 the actuating element 120b can be directly actuated on one side by a seat user seizing an actuating lever 109 pivotally attached to the seat frame and having a cross bar by means of the actuating handle 190 provided for this (not shown in FIG. 6a) and swiveling this counter-clockwise whereby the actuating element 120b moves down against the pretension of the spring assembly 120a. On the other hand, the fixing device 120 can also be released by folding the seat back forwards whereby the seat back is coupled to the actuating lever 109 through a Bowden cable which has a cable 121b and whose Bowden tube (not shown) is supported on a Bowden cable support 121. Furthermore, a gearing part 122 is mounted on the swivel axis of the actuating lever 109 by means of an axle shaft 124, the gearing part having a guide 122a as well as a mounting 122b for the cable 121b of the Bowden cable. This gearing part 122 converts a tightening of the cable 121b when folding the backrest forwards into a swivel movement which in turn is transferred through two arms 123 of the gearing which engage round the actuating lever 109 to same. The actuating lever 109 thereby swivels clockwise when folding the backrest forwards and releases the fixing device 120 through the actuating element 120b.

Furthermore a cable nipple 168 is fixed, e.g. squashed, on the cable 121b of the Bowden cable between the Bowden cable support 121 which is fixed by means of a fixing plate 121a on the seat rail, and the gearing 122. The cable nipple 168 is associated with a switch element in the form of a switch lever 106 which is mounted by means of a bearing bushing 165, a stepped bolt 165a as well as a screw 166 to pivot about an axis formed by the longitudinal axis of the stepped bolt 165a, and which is at the same time fixed on the seat frame (not shown) or its seat rail 102. The switch lever 106 has in an upper section 161 a stop 162 which is mounted directly adjacent the cable nipple 168 and on which the cable nipple 168 can act in the seat longitudinal direction whereby the switch lever 106 is pivoted.

The second end section of the switch lever 106 mounted underneath the bearing bush 165 and stepped bolt 165a forms an actuating section 160 associated with an actuating section of a locking pawl 104 of the memory device. The actuating section of the locking pawl 104 is thereby formed by an actuating face 140 on the top side of the locking pawl.

The switch lever 106 is here locked in the position illustrated in FIGS. 6 and 6a in which the actuating section 160 acts on the actuating surface 140 of the locking pawl 104, through a projection 191 of the actuating lever 109 on which the upper section 161 of the switch lever 106 is vertically (across the seat longitudinal direction L) supported by a stop 163. The torque required for this is applied by the spring assembly 120a of the fixing device 120 which acts on the lever projection 191 through the actuating element 120b and the actuating lever 109.

As an alternative or in addition the perpendicular position of the switch lever 106 can also be supported by a spring mounted directly on the switch lever 106 (not shown) or in that the switch lever 106 is mounted with sufficient friction which cannot be overcome by the action of the compression spring 400 of the locking pawl 104.

The locking pawl 104 itself is as can be seen from FIG. 6a pivotally mounted on a bearing pivot 155 of a slide 105 which is guided with a base body 150 in the seat longitudinal direction L movable next to the detent openings 170 of the ratchet rail 107. The slide has in its base body 150 a recess 152 in which the compression spring 400 is mounted which acts underneath the actuating surface 140 of the locking pawl 104 on the latter and thereby pretensions the locking pawl 104 so that a detent hook 141 arranged at the other end of the locking pawl 104 has the tendency to engage in the ratchet rail 107. In the situation illustrated in FIGS. 6 and 6a in which the seat is locked in the memory position with the backrest not folded forwards, the locking pawl is blocked so that the actuating section 160 of the switch lever 106 is supported on the actuating face 140 of the locking pawl 104 so that the latter cannot swivel about the bearing pin 155 in order to bring the detent hook 141 into engagement with the ratchet rail 107.

In the situation illustrated in FIGS. 6 and 6a, a counter stop 144 of the locking pawl 104 is in contact with a stop 132 of a stop element 103 which is fixed by fixing screws 136 on the seat rail 102. Furthermore, a follower 143 of the locking pawl 104 which adjoins the counter stop 144 at the top is located in engagement with an engagement region 134 of the stop element 103.

If, in the state of the seat illustrated in FIGS. 6 and 6a in which the seat is locked in the memory position, the backrest is folded forwards then the cable 121b of the Bowden cable is tensioned and moved towards the rear seat end (on the backrest side).

Figure 7:
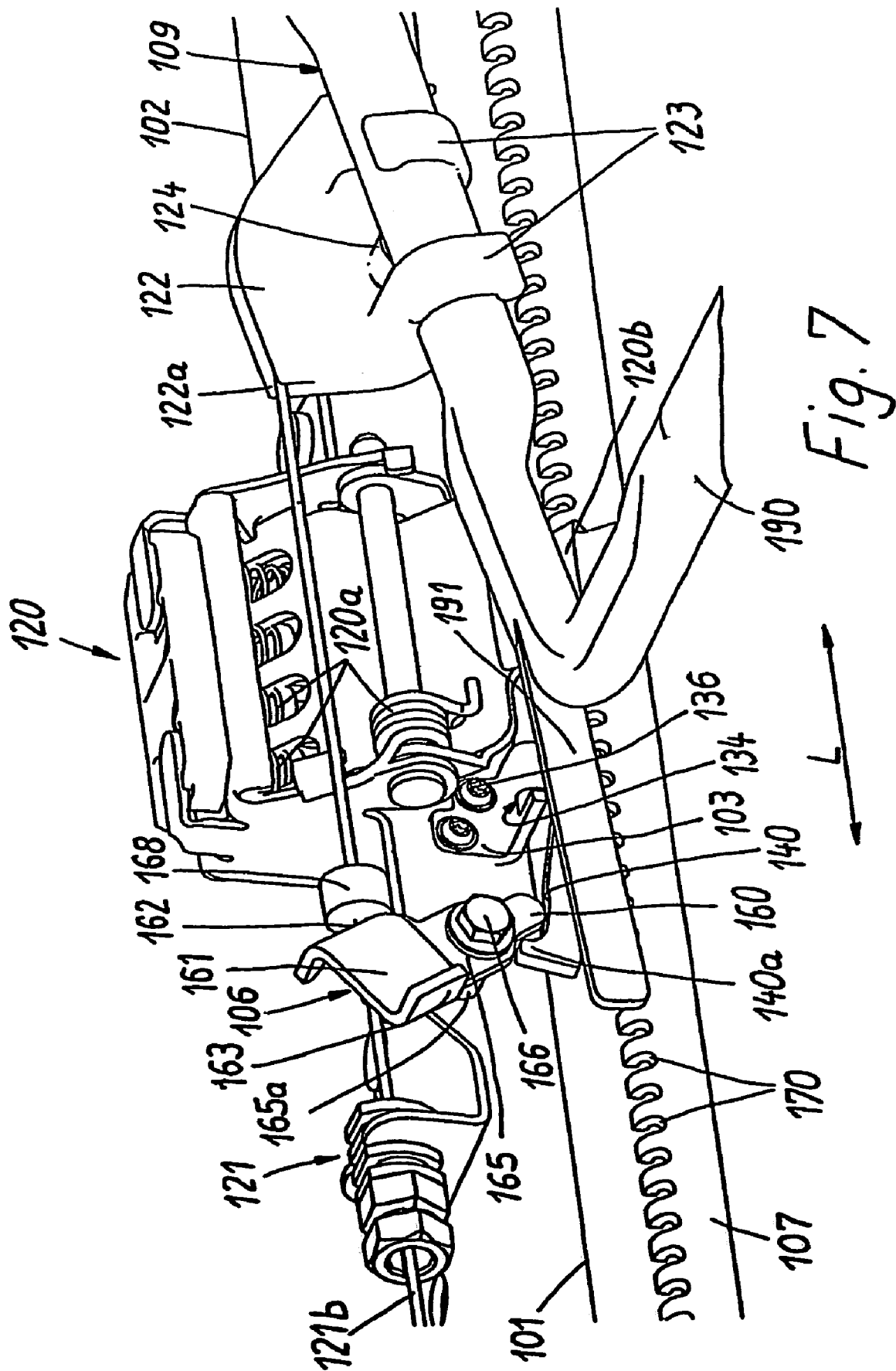
FIG. 7 is a view according to FIG. 6 in a state in which the backrest is folded forwards in order that the seat can be moved with the backrest folded forwards.

According to FIG. 7, on the one hand, the actuating lever 109 is pivoted through the gearing part 122 and the arms 123 counter-clockwise whereby it acts on the actuating element 120b and releases the fixing device 120. On the other hand, the cable nipple 168 which is squashed with the cable 121b is moved towards the rear seat end and thereby acts on the stop 162 in the upper section 161 of the switch lever 106. The switch lever 106 is thereby swivelled counter-clockwise whereby its actuating section 160 is lifted from the associated actuating face 140 of the locking pawl 104. This swivel movement of the switch lever 106 is possible since this is no longer blocked through the lever projection 191 which was indeed pivoted downwards together with the actuating lever 109. With the switch lever 106 having released the locking pawl 104 the latter now swivels as a result of the action of the compression spring 400 (see FIG. 6a) about the bearing pivot 155 of the slide 105 until the detent hook 141 engages in an opening 170 of the ratchet rail 107. The locking pawl 104 and thus the memory device overall is thereby locked.

The swivel movement of the locking pawl 104 has moreover the result that the follower 143 of the locking pawl 104 and the engagement area 134 of the stop element 103 move out of engagement. This is necessary in order that the seat frame can be moved since otherwise movement of the seat would be blocked by the locked memory device.

The cable nipple 168 thereby serves here as locking means which with the backrest folded forwards acts on the switch lever 106 so that the locking pawl 104 cannot be released by means of the switch lever 106.

The arrangement is designed so that when tilting the backrest forwards the detent hook 141 can engage under the action of the compression spring 400 already in a detent opening 170 before the fixing device 120 is released so far that the seat rail 102 can be displaced relative to the rail 101 fixed on the body. A reliable storage of the actual seat longitudinal position as the memory position is hereby guaranteed. If the detent hook 141 cannot engage directly in a detent opening 170 because the seat is positioned such that the detent hook 141 under the action of the compression spring 400 strikes on a web between the two detent openings 170, then the detent hook 141 only engages in the next detent opening 170 which it passes after a slight displacement of the seat frame in the seat longitudinal direction L. In such a case a slight deviation arises between the seat longitudinal position when folding the backrest forwards and the then subsequently stored memory position.

In the state illustrated in FIG. 7, which was reached by folding the backrest forwards, the seat frame can now be pushed forwards with the backrest folded forwards in the seat longitudinal direction L in order to make it easier for a passenger to enter or place objects in the back of the vehicle.

If the seat is then moved back with the backrest folded forwards it is automatically stopped at the latest in the memory position defined by the locking pawl 104. For on reaching the memory position the stop 132 of the seat frame moves into contact with the counter stop 144 of the memory device whereby a further movement of the seat frame backwards is prevented.

If then the backrest is folded back again into its function position then the tension of the cable 121b is released and the switch lever 106 as well as the actuating lever 109 with the projection 191 fixed thereon move back into the position illustrated in FIGS. 6 and 6a. If then the actuating lever 109 is swiveled counter-clockwise in order to release the fixing device 120 then the position illustrated in FIG. 8 is adopted.

On manually pivoting the actuating lever 109 by means of the actuating handle 190 provided for this purpose the fixing device 120 is indeed released through the actuating element 120b so that the seat frame can be moved in the seat longitudinal direction L on the rail 101 fixed on the body; however here—as opposed to folding the backrest forwards—the switch lever 106 remains in its upright position in which its actuating section 160 acts vertically on the actuating surface 140. It is hereby prevented that the locking pawl 104 is locked through the action of the compression spring 400.

Figure 8:
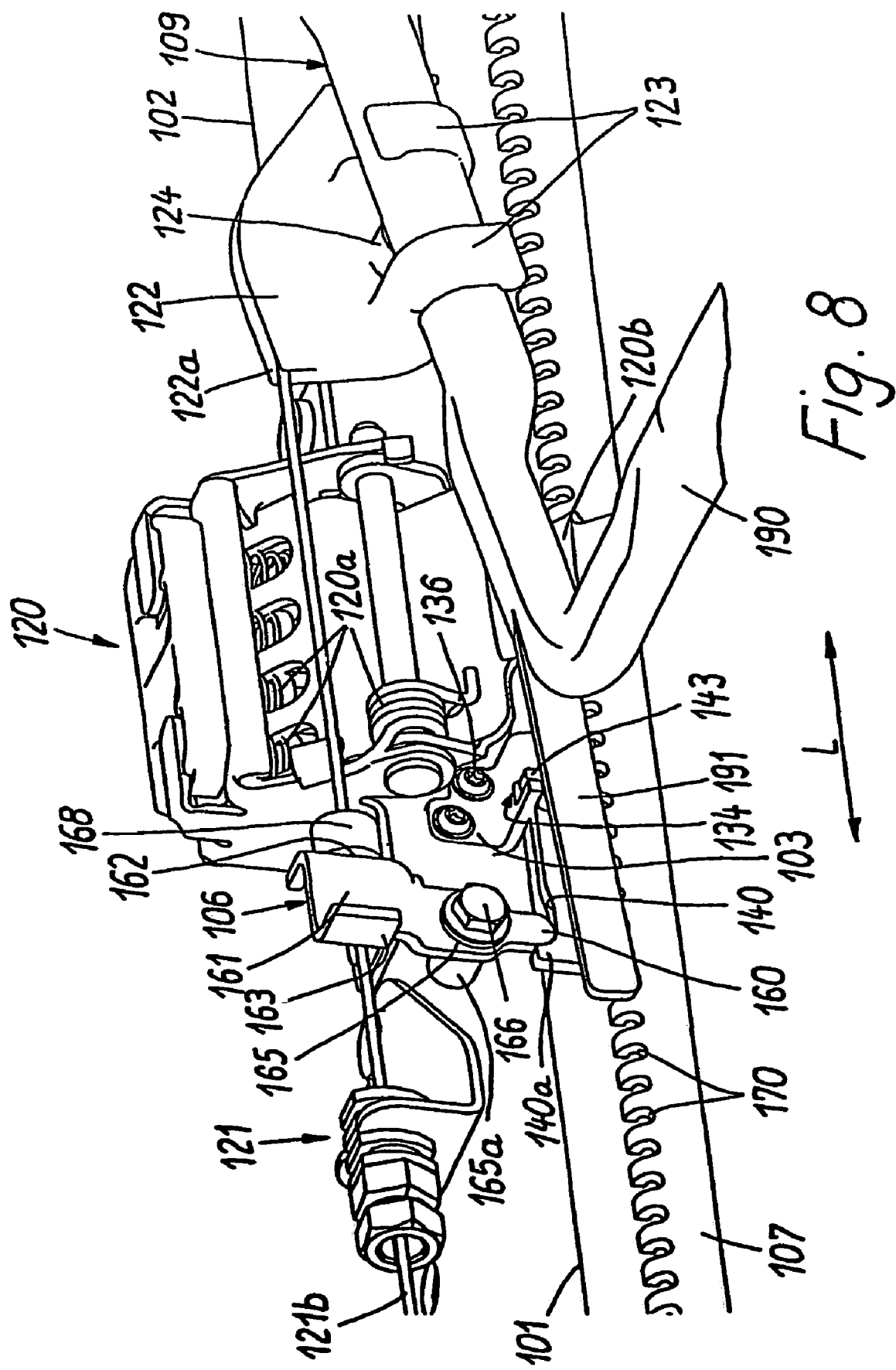
FIG. 8 is a view according to FIG. 6 in a state in which with the backrest raised up in the memory position an actuating lever was actuated to re-set the memory position.

As a result of the lever projection 191, which is swiveled down according to FIG. 8 and which consequently does not adjoin the associated stop 163 of the switch lever 106, the vertical position of the switch lever 106 must be secured for example by a suitable formation of the actuating surface 140 of the locking pawl 104. The actuating surface 140 can hereby be curved so that under the action of the compression spring 400 of the locking pawl 104 it exerts no torque on the actuating section 160 of the switch lever 106 which would cause a pivotal movement of the switch lever 106 counter-clockwise.

In other words, the interaction of the actuating face 140 of the locking pawl 104 with the actuating section 160 of the switch lever 106 must be such that through the forces introduced by the compression spring 400 from the locking pawl 104 no pivotal movement of the switch lever 106 counter-clockwise is initiated. A pivotal movement of the switch lever 106 in the clockwise direction is, however, blocked by the cable nipple 168.

Alternatively the perpendicular position of the switch lever 106—as already mentioned—can also be secured by means of a suitable spring element (not shown) or by sufficiently large friction forces.

In short, the actuation of the actuating lever 109 in the memory position of the seat (with the backrest not folded forwards) leads to, on the one hand, the fixing device 120 being released while at the same time the locking pawl 104 and thus the memory device remain overall in the released state, which already existed before pivoting the actuating lever 109, see FIGS. 6 and 6a. Moreover, the follower 143 of the memory device engages in the engagement region 134 of the stop element 103 on the seat rail side.

In this state, movement of the seat frame in the seat longitudinal direction L leads to, at the same time, the locking pawl 140 being entrained so that during sliding of the seat, a new memory position is set also at the same time. The newly set memory position which corresponds to the seat longitudinal position newly set by sliding the seat frame is, however, not already locked when the actuating lever 109 is finally let go. For this has, according to FIGS. 6 and 6a, at first only the result that the fixing device 120 is locked and thus the seat rail 102 is locked relative to the rail 101 fixed on the body. Locking of the memory device, however, only happens according to FIG. 7 when in the new seat longitudinal position the seat back is folded forwards. Thus, in the present embodiment, the memory device is then only locked when the seat is moved forwards with the backrest folded forwards within the scope of the easy-entry function.

Figure 9:
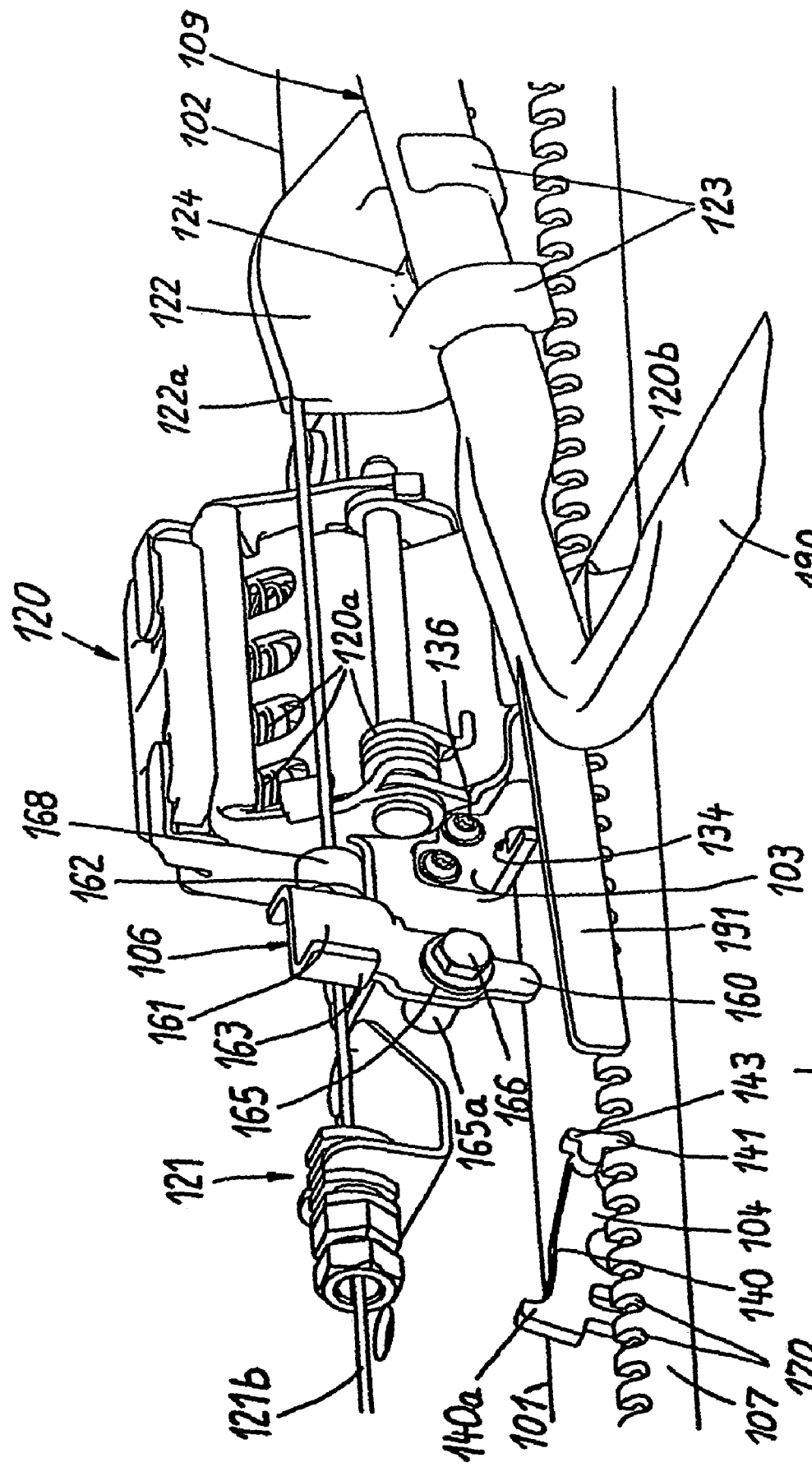
FIG. 9 is a view according to FIG. 6 in a state in which the memory position of the seat is approached with the backrest raised up.

FIG. 9 shows the seat frame after it was first pushed forwards with the seat back folded forwards in the seat longitudinal direction L whereby the locking pawl 104 has been left back locked in the original seat position, and after then the backrest was folded back again into its function position. Furthermore the actuating lever 109 is pivoted so that the fixing device 120 is released and the seat frame can be adjusted in the seat longitudinal direction selectively forwards or backwards. In each seat longitudinal position which is hereby reached the seat frame can be locked by the fixing device 120 relative to the rail 101 fixed on the body by letting go the actuating lever 109.

Figure 10:
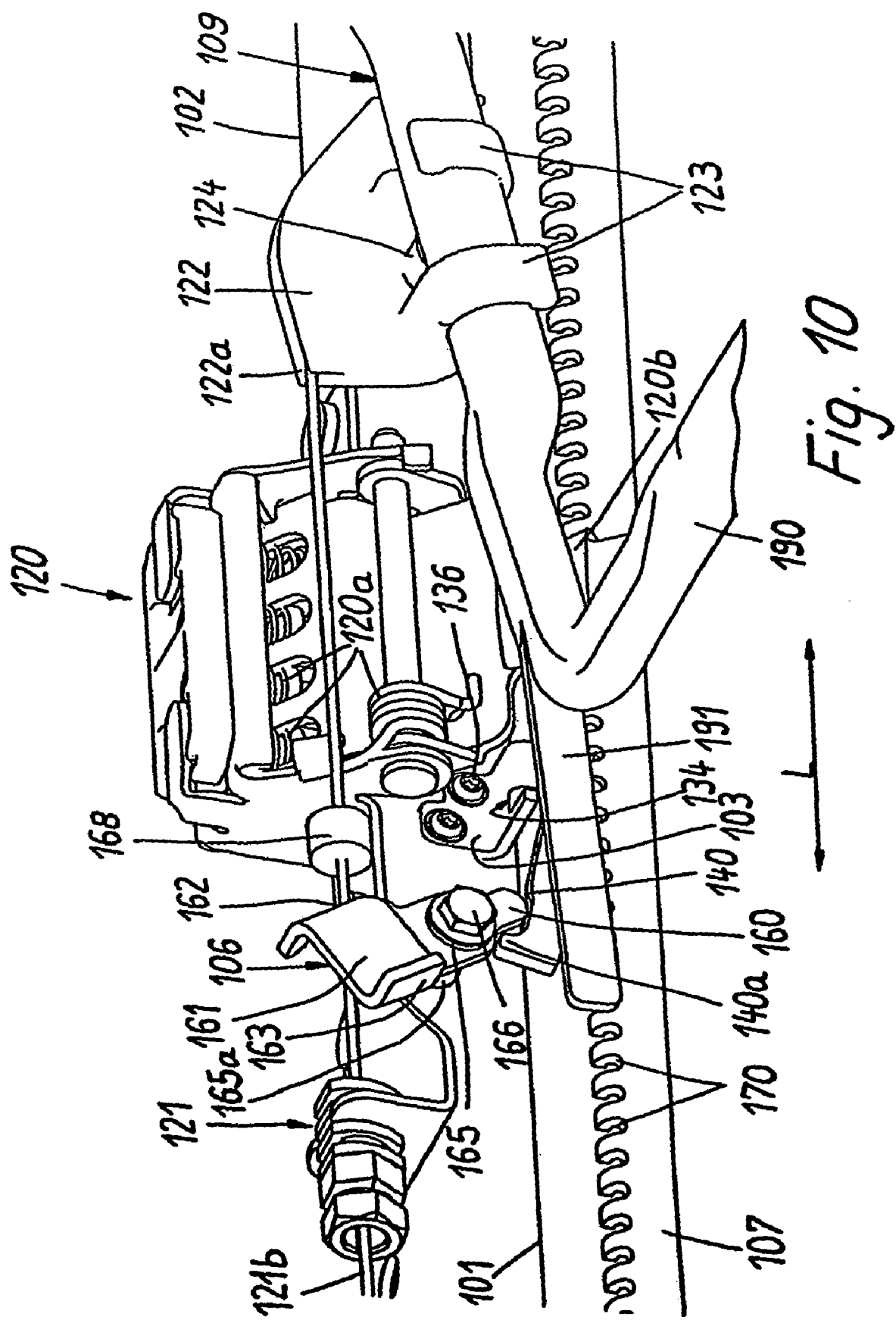
FIG. 10 is a view according to FIG. 6 in a state in which the memory position of the seat is reached with the backrest raised up.

FIG. 10 finally shows the position of the seat frame when the latter is moved back with the backrest upright into the memory position. The switch lever 106 thereby stops with its actuating section 160 against a projection 140a which projected vertically upwards from the actuating surface 140 of the locking pawl 104. This is due to the fact that the locking pawl 104 is located in the locked state in which it engages by its detent hook 141 (see FIG. 6a) in a detent opening 170 of the ratchet rail 107. Through the inclined position of the actuating face 140 of the locking pawl 104 associated with this the pawl exerts on the actuating section 160 of the switch lever 106 a torque with a component both parallel and perpendicular to the seat longitudinal direction L. As a result of this the switch lever 106 is pivoted counter—clockwise and its actuating section 160 engages with the projection 140a of the locking pawl 104. This has the effect that the locking pawl 104 remains locked when the seat lower frame has reached the memory position shown in FIG. 10.

In short, the actuating face 140 in the locked state of the locking pawl 104 interacts with the actuating section 160 of the switch lever 106 so that the latter is pivoted when the seat is pushed with the backrest upright into the memory position whereby release of the locking pawl 104 is prevented.

(If the seat is pushed back with the backrest folded forwards into the memory position then the switch lever 106 as a result of the action of the cable nipple 168 is swiveled anyhow, see FIG. 7 so that also in this case no release of the memory device can take place). On the other hand, the actuating face 140 of the locking pawl 104 and the actuating section 160 of the switch lever 106 interact in the released state of the locking pawl 104, see FIG. 6, so that the locking pawl 104 remains released, as described in further detail above with reference to FIG. 6.

As a result of the locked state of the locking pawl 104, the seat frame on reaching the memory position is automatically stopped when the stop 132 of the stop element 103 on the seat frame side becomes blocked with the counter stop 144 of the memory device (see FIG. 6a).

If then in the memory position the actuating lever 109 is let go the latter is swiveled clockwise through the action of the spring assembly 120a of the fixing device 120 until the fixing device 120 is again locked. At the same time, through the projection 191 of the actuating lever 109 which acts on the angled stop 162 in the upper section 161 of the switch lever 106, the switch lever 106 is pivoted clockwise into its perpendicular position whereby the switch lever 106 acts by its actuating section 160 on the actuating face 140 of the locking pawl 104 and releases same (against the action of the compression spring 400)—(which requires a suitable design of the spring assembly 120a).

The seat is then located again in the state explained with reference to FIGS. 6 and 6a with the backrest raised up in the memory position.

A further development according to the invention of the known vehicle seat described above with reference to FIGS. 6 to 11 will now be explained with reference to FIGS. 1a to 3. The vehicle seat and its seat frame illustrated in FIGS. 6 to 11 substantially agree regarding the design of the rail longitudinal guide 101, the seat rail 102, the design of the fixing device 120 as well as regarding the design of the memory device 104, 105, 107, with the vehicle seat described with reference to FIGS. 6 to 11. These features will therefore not be described in finer detail. Instead, in this respect reference is made to the explanations provided above on FIGS. 6 to 11 whereby using matching reference numerals for corresponding component parts in FIGS. 1a to 3, on the one hand, and in FIGS. 6 to 11, on the other hand, the required connections are provided.

The essential characteristic features of the embodiment illustrated in FIGS. 1a to 3 of the invention lie in the formation of a follower and an associated locking element which enable an automatic re-adjustment of the memory position when the vehicle seat is moved with the backrest raised up (backrest in useful position) and which prevent a resetting of the memory position if the vehicle seat is displaced for executing an easy-entry function with the backrest folded forwards on the seat surface. These two function groups will now be described with reference to FIGS. 1a to 3.

In FIG. 1a a perspective view shows a seat longitudinal guide 101, 102 consisting of a lower rail 101 to be mounted fixed on the body and an upper rail 102 which supports the seat frame. This longitudinal guide 101, 102 enables an adjustment of the seat longitudinal position (position of the seat frame in the seat longitudinal direction L).

In order to lock a previously set seat longitudinal position a fixing device 120 provided with elastically pretensioned locking teeth Z is mounted on the top rail 102 on the seat side (seat rail) and whose locking teeth Z can engage in associated detent openings of the lower rail fixed on the body in order to lock the two rails 101, 102. Through the elastic pretension of the locking teeth Z in the direction of the associated detent openings the fixing device 120 has the tendency to lock the two rails 101, 102 together if this is not released by action on an actuating element 102b provided for this purpose (see FIGS. 7 to 10). This action can—as already mentioned with reference to FIGS. 6 to 11—take place on one side by a direct release of the fixing device through a suitable actuating lever or indirectly by folding the backrest forwards to trigger the easy-entry function.

Furthermore from FIG. 1a, and in particular FIG. 1b in which the rails 101, 102 are not shown, the essential constituent parts of a memory device 104, 105, 107 can be seen, namely a slide 105, a locking pawl 104 swivel mounted on the slide 105, as well as a ratchet rail 107 provided with detent openings 170, in which a detent hook 141 of the locking pawl 104 can engage for locking a previously set memory position. Also here reference is made to the explanations on FIGS. 6 to 11.

FIGS. 1a and 1b show a section of the seat frame formed according to the invention in a state in which the seat with the backrest raised up (in its useful position) is locked in a memory position by means of the fixing device 120.

In this state a hold down member in the form of a follower 203 acts on the locking pawl 104 of the memory device so that the locking pawl 104 is lifted by its detent hook 141 out from the ratchet rail 107. The follower 203 is mounted longitudinally displaceable on the seat rail 102 or on a holding part 201 fixed on the seat rail 102 and comprises an elongated base body 230 on whose lower end facing the locking pawl 104 is fixed or formed a follower element 234 which is provided with an entrainment opening 235. This follower 203 is pretensioned by means of an elastic element 232 in the form of a compression spring (resetting spring), which is supported on one side on the holding part 201 and on the other on a projection 231 protruding from the base body 230 of the follower 203, in a direction away from the locking pawl 104 so that it has the tendency to lift away from the locking pawl 104. This is, however, prevented by a locking element 221 on the base body 220 of a lever 202, which is pivotally mounted above an axis 225 and which is pretensioned by means of a spring element 228 in the form of a torsion spring in the direction of the projection 231 of the follower 203 so that the locking element 221 presses the follower against the action of the elastic element 232 provided on the follower against the locking pawl so that the detent hook 141 of the locking pawl 104 is lifted out from the ratchet rail 107. At the same time a projection 145 of the locking pawl formed as a detent nose engages in the entrainment opening 235 of the follower 203.

This is achieved in that the locking element 221 which is pretensioned by the torsion spring 228 exerts on the follower 203 a force in the direction of the locking pawl 204 which is greater than the force acting as a result of the compression spring 232 in the opposite direction. The detent hook 141 is thus lifted out from the detent openings 170 of the ratchet rail 107 and the locking pawl 104 can during displacement of the seat with the backrest raised up be entrained in the seat longitudinal direction L so that the memory position is set anew at the same time as the seat is displaced.

If in the state of the seat illustrated in FIGS. 1a and 1b the backrest is folded forwards towards the seat surface, the cable 121a of a Bowden cable 121a, 121b is thereby tensioned which is connected by one end to the seat back and by the other end to the base body 220 of the pivotally mounted lever 202. The lever 202 is hereby pivoted so that the locking element 221 is lifted from the projection 231 of the follower 203 and thus the follower is lifted from the locking pawl 104 under the action of the compression spring 232. Since the locking pawl 104—as explained with reference to FIGS. 6 to 10—is again set under pretension by means of a spring element so that the detent hook 141 of the locking pawl 104 has the tendency to engage in one of the detent openings 170 of the ratchet rail 107 then the locking pawl 104 is locked in its actual position. This corresponds to a locking of the memory device 104, 105, 107 overall. This state is shown in FIG. 2.

The mechanism is designed so that the locking of the memory device 104, 105, 107 is carried out during folding the backrest forwards about 20° to 40° from a vertical useful position. The locking of the memory device thus takes place already in the first stage (phase) of activating the easy entry mechanism by folding the backrest forwards towards the seat surface. The fixing device 120 is locked in this first phase of folding the backrest forwards as before so that no displacement of the seat can take place in the longitudinal direction L.

This is only possible on folding the backrest further forwards whereby according to FIG. 3 an actuating section 222 provided on the pivotally mounted lever 202 acts on the actuating lever 109 of the fixing device 120 illustrated in FIGS. 7 to 10 so that the fixing device 120 is released. This then enables a displacement of the seat in the longitudinal direction L.

According to this, displacement of the seat in the longitudinal direction L is only possible on folding the backrest forwards to execute the easy-entry function after the locking pawl 104 of the memory device 104, 105, 107 has been locked. Thus, the memory position which exists when folding the backrest forwards is reliably fixed before a displacement of the seat can take place with the backrest folded forwards. This memory position can then be located when subsequently moving the seat back again, as explained above with reference to FIGS. 6 to 10. It is thus prevented that when implementing the easy-entry function displacement of the seat with the backrest folded forwards can take place before the starting position of the seat is fixed as memory position.

The entire assembly is thereby very compact as a result of the ability of the follower 203 to slide substantially perpendicular to the extension direction L of the seat longitudinal guide as well as through the pivotal bearing of the lever 202 with the locking element 221 and is located substantially within the space enclosed by the rails 101, 102 of the rail longitudinal guide or only projects upwards from same.

If according to FIGS. 1a to 3 the backrest of the seat is folded forwards in order to trigger the easy-entry function then the problem may arise that the detent hook 141 of the locking pawl 104 cannot engage in one of the detent openings 170 of the ratchet rail 107. For the fixing device 120 enables as a rule an infinite adjustment of the seat longitudinal position, see the fixing device described in DE 299 10 720 U1, while here for locking the memory position a finely stepped (thus no infinite) engagement is provided (by using the ratchet rail 107 with detent openings 170). Thus it may happen that when folding the backrest forwards the detent hook 141 of the locking pawl 104 cannot engage in a detent opening 170 but stands up on the edge. Initially no locking of the memory position is then possible.

If now with the backrest folded forwards the seat frame and thus also the seat rail 102 are moved forwards out from the memory position in the seat longitudinal direction (easy-entry function) then the locking pawl 104 is thereby entrained together with the slide 105 along a little since a stop 127 provided on the seat rail 102 acts on an associated stop 147 on the locking pawl side. The locking pawl 104 and slide 105 are thereby entrained only so far until the detent hook 141 of the locking pawl 104 can engage completely in the next detent opening 170 of the ratchet rail 107 under the action of the spring element provided on the locking pawl. The locking pawl 104 and thus the locking device 104, 107 of the memory device 104, 105, 107 as a whole are then locked in that memory position which lies closest to the seat longitudinal position in which the fixing device 120 was locked prior to folding the backrest forwards.

In the locking state in which the detent hook 141 of the locking pawl 104 engages in a detent opening 170 of the ratchet rail 107, the stop 147 on the locking pawl side is located beneath the stop 127 on the seat rail side so that these stops 127, 147 can no longer move into active connection with each other. The seat can then be moved forwards further in the seat longitudinal direction L whereby the locking pawl 104 and slide 105 remain in the previously locked memory position.

FIG. 4 shows a modification of the embodiment of FIGS. 1a to 3, namely with a view of approaching the memory position when sliding back the seat with the backrest raised and thus located in the useful position. This relates in particular to the case where the seat is moved backwards towards the memory position whilst a vehicle occupant is seated on the seat.

If the seat is pushed with the backrest raised up into the memory position after it previously has been pushed out from the memory position with the backrest folded forwards, thus without entrainment of the locking pawl 104 and slide 105 then the follower 203 on reaching the memory position strikes the locking pawl 104. The follower 203 is thereby pressed down by means of the locking element 221 (not shown in FIG. 4) towards the locking pawl 104 of the memory device owing to the backrest located in the useful position.

In the state illustrated in FIG. 4, in order to enable reaching the actual memory position in which the follower 203 engages positively in the locking pawl 104, the locking pawl 104 has a ramp 146 on which the lower end section 234' of the follower 203 can slide up to an indent 145' of the locking pawl 104. This is shown in FIGS. 5a to 5c whereby the follower 203 then engages in the memory position with its lower end section 234' into the associated indent 145' of the locking pawl 104. The lower end section 234' of the follower 203 as well as the indent 145' of the locking pawl 104 then act as stops which enable entrainment of the locking pawl 104 together with the slide 105 during further displacement of the seat.

The ramp 146 thereby extends only over a part of the width of the locking pawl 104 (extension perpendicular to the seat longitudinal direction L and to the movement direction of the follower 203) so that adjoining areas 148 of the locking pawl 104 can act as stops in order to define the memory position in the locked state of the locking pawl 104.

Since the follower 203 on approaching the memory position with the backrest raised up and located in the useful position is pressed down towards the locking pawl 104, on approaching the memory position it also lifts at the same time the detent hook 141 of the locking pawl 104 out from the associated ratchet rail 107. Only then is the common further displacement possible of the seat on one side and of the locking pawl 104 and slide 105 on the other.

Through the interaction of the stop 127 on the seat frame side with the stop 147 on the locking pawl side when approaching the memory position, whereby the stop 147 of the locking device (locking pawl 104) on the locking pawl side is supported vertically (parallel to the direction of movement of the follower 203) on the stop 127 on the seat frame side, while the follower 203 slides along the ramp 146, lifting of the locking pawl 104 out from the associated ratchet rail 107 is only possible after the stop 147 on the locking pawl side has passed the stop 127 on the seat frame side. The follower 203 then engages in the indent 145'. Since the stops 127, 147 first prevent a pivotal movement of the locking pawl 104 and the ramp 147 runs inclined in the seat longitudinal direction, the follower 203 is first raised on travelling over the ramp 146. The follower 203 which is mounted resiliently (by means of the spring 232) hereby carries out a compensating movement in the vertical direction.

In short, the embodiment of the invention illustrated in FIGS. 4 to 5c enables, when approaching the memory position with the backrest raised up in the useful position, an automatic entrainment of the parts 104, 105 of the memory device located in the memory position so that when adjusting the seat with the backrest raised up an automatic re-setting of the memory position can take place. If, however, the memory position is arrived at with the backrest folded forwards onto the seat, then the follower 203 is located under the action of the compression spring 232 in a position in which it cannot act on the locking pawl 104 of the memory device 104, 105, 107. The locking pawl 104 thereby remains together with the slide 105 locked in the memory position in which the seat is then automatically stopped so that the previously set memory position has been relocated when sliding the seat back with the backrest folded forwards—as desired.

As can be seen in particular from FIG. 4 the follower 203 is only first able to move onto the locking pawl 104 through the ramp 146 since otherwise the follower 203 on approaching the memory position would stop with the locking pawl 104 and could not move onto same in order to release the locking device. In other words, the hold down member is lifted by means of the ramp (towards the indent 145').

The invention claimed is:
1. A motor vehicle seat comprising:
a seat frame;
a backrest which is pivotally mounted on the seat frame and which is folded forwards from a useful position towards a seat surface of the seat frame;
a longitudinal guide with which the seat frame is movable in the seat longitudinal direction for adjusting the longitudinal position of the seat,
a fixing device for locking the seat frame in a previously adjusted seat longitudinal position;
an actuating element for releasing the fixing device so that the seat frame is movable in the seat longitudinal direction;

a coupling mechanism which acts on the actuating element and releases the fixing device when the backrest has been folded forwards towards the seat surface;

a memory device with which the seat frame, when moving in the seat longitudinal direction, is automatically stoppable in an adjustable seat longitudinal position defined as a memory position;

a locking device of the memory device for locking a set memory position; and a lever through which the locking device is coupled to the backrest;

wherein the backrest is coupled to the fixing device on one side and to the locking device on the other side so that when folding the backrest forwards towards the seat surface, at first by the locking device the actual seat longitudinal position is locked as the memory position and then the fixing device is released.

2. The motor vehicle seat according to claim 1, wherein the coupling mechanism which acts on the actuating element and releases the fixing device when the backrest has been folded forwards towards the seat surface, as well as the lever through which the locking device is coupled to the backrest, form a multi-stage acting locking and release kinematic system which acts, on one side, on the fixing device and on another side, on the locking device in order to actuate the fixing device in at least two stages.

3. The motor vehicle seat according to claim 1 or 2, wherein in a first stage, the actual seat longitudinal position is locked by the locking device as the memory position, and in a second stage, the fixing device is released.

4. The motor vehicle seat according to claim 1, wherein the coupling mechanism only acts on the actuating element to release the fixing device after the actual seat longitudinal position has been locked as the memory position by the locking device.

5. The motor vehicle seat according to claim 1, wherein the coupling mechanism already acts on the actuating element to release the fixing device before the actual seat longitudinal position has been locked as the memory position by the locking device and wherein the release of the fixing device is only active after the actual seat longitudinal position has been locked as the memory position by the locking device.

6. The motor vehicle seat according to claim 1, wherein the locking device has a locking unit, which is displaceable in the seat longitudinal direction and which defines the memory position at the same time.

7. The motor vehicle seat according to claim 6, wherein the locking unit is assigned a detent device which has in the seat longitudinal direction detent points arranged in succession and on which the locking unit can be locked relative to the detent device.

8. The motor vehicle seat according to claim 7, wherein the locking unit comprises a pivotally mounted locking pawl which has a detent element which can engage on the detent points in the detent device.

9. A motor vehicle seat comprising:

a seat frame;

a backrest which is pivotally mounted on the seat frame and which is foldable forwards from its useful position towards a seat surface of the seat frame;

a longitudinal guide with which the seat frame is movable in the seat longitudinal direction for adjusting the longitudinal position of the seat;

a fixing device for locking the seat frame in a previously adjusted seat longitudinal position;

an actuating element for releasing the fixing device so that the seat frame is movable in the seat longitudinal direction;

a coupling mechanism which acts on the actuating element and releases the fixing device when the backrest has been folded forwards towards the seat surface;

a memory device with which the seat frame, when moving in the seat longitudinal direction, is automatically stoppable in an adjustable seat longitudinal position defined as the memory position;

a locking device of the memory device for locking a set memory position; and a lever through which the locking device is coupled to the backrest;

wherein a movably mounted follower is provided, which with the backrest in the useful position is held by a locking element in a position in which the locking element acts on the memory device in the memory position of the seat so that the memory position is adjusted together with the seat frame when the seat longitudinal position is adjusted.

10. The motor vehicle seat according to claim 9, wherein the locking element is pivotally mounted.

11. The motor vehicle seat according to claim 9, wherein the locking element is provided on a lever which has an actuating section for releasing the fixing device.

12. The motor vehicle seat according to claim 9, wherein the follower is mounted longitudinally displaceable.

13. The motor vehicle seat according to claim 9, wherein the follower acts positively on the memory device in order to adjust the memory position at the same time as adjusting the seat longitudinal position.

14. The motor vehicle seat according to claim 9, wherein the follower is mounted on the seat frame.

15. The motor vehicle seat according to claim 9, wherein a hold down member serves as the follower, which in the memory position of the seat and with the backrest located in the useful position acts on the memory device so that the memory position during adjustment of the seat longitudinal position is adjusted together with the seat frame.

16. The motor vehicle seat according to claim 9, wherein on the memory device there is a ramp with which the follower comes into active connection on approaching the memory position.

17. The motor vehicle seat according to claim 16, wherein the follower comes into active connection on approaching the memory position by the follower sliding along the ramp on approaching the memory position.

18. The motor vehicle seat according to claim 9, wherein the locking element is coupled to the backrest by a traction member.

19. The motor vehicle seat according to claim 18, wherein the traction member comprises a core of a Bowden cable.

20. The motor vehicle seat according to claim 9, wherein the follower, wherein on folding the backrest forwards, lifts away from the memory device before the fixing device is released.

21. The motor vehicle seat according to claim 20, wherein when folding the backrest forwards about a first angular region from its useful position, the follower lifts away from the memory device and thereby fixes the memory position, and wherein on folding the backrest further forwards, the fixing device is released.

22. The motor vehicle seat according to claim 9, wherein the follower is coupled to a resetting device which when the backrest is folded forwards lifts the follower from the memory device.

23. The motor vehicle seat according to claim 22, wherein the resetting device comprises a resetting spring.

24. The motor vehicle seat according to claim 23, wherein the locking element is elastically pretensioned towards the follower.

25. The motor vehicle seat according to claim 24, wherein the pretension with which the locking element acts on the follower is greater than the resetting action of the resetting spring which is coupled to the follower.

26. The motor vehicle seat according to claim 24 or 25, wherein the locking element, when folding the backrest forwards is lifted away from the follower under the action of the resetting spring.

27. The motor vehicle seat according to one of claims 9 to 23, wherein when folding the backrest forwards, the locking element releases the follower.

28. The motor vehicle seat according to claim 27, wherein the locking element lifts away from the follower when the backrest is folded forwards.

29. The motor vehicle seat according to claim 9, wherein the locking device of the memory device is locked when the seat is located out of the memory position.

30. The motor vehicle seat according to claim 29, wherein the locking device is pretensioned towards the locked state.

31. A motor vehicle seat, comprising:
a seat frame;
a backrest which is pivotally mounted on the seat frame and which is foldable forwards from its useful position towards a seat surface of the seat frame;
a longitudinal guide with which the seat frame is movable in the seat longitudinal direction for adjusting the longitudinal position of the seat;
a fixing device for locking the seat frame in a previously adjusted seat longitudinal position;
an actuating element for releasing the fixing device so that the seat frame is movable in the seat longitudinal direction;
a coupling mechanism which acts on the actuating element and releases the fixing device when the backrest has been folded forwards towards the seat surface;
a memory device with which the seat frame, when moving in the seat longitudinal direction, is automatically stoppable in an adjustable seat longitudinal position defined as a memory position;
a locking device of the memory device for locking a set memory position; and
a lever through which the locking device is coupled to the backrest;
wherein a movably mounted follower is provided which with the backrest, in the useful position, is held by a locking element in a position in which it acts on the memory device in the memory position of the seat so that the memory position is adjusted together with the seat frame when the seat longitudinal position is adjusted,
and wherein the follower, on approaching the memory position with the backrest located in the useful position, acts on the memory device so that its locking device is released on approaching the memory position and, wherein
the locking device of the memory device is locked when the seat is located out of the memory position.

32. The motor vehicle seat according to one of claims 29 to 31, wherein the follower, with the backrest folded forwards, is located under action of a resetting spring in a position in which it does not act on the memory device.

33. A motor vehicle seat, comprising:
a seat frame;
a backrest which is pivotally mounted on the seat frame and which is foldable forwards from its useful position towards a seat surface of the seat frame;
a longitudinal guide with which the seat frame is movable in the seat longitudinal direction for adjusting the longitudinal position of the seat;
a fixing device for locking the seat frame in a previously adjusted seat longitudinal position;
an actuating element for releasing the fixing device so that the seat frame is movable in the seat longitudinal direction;
a coupling mechanism which acts on the actuating element and releases the fixing device when the backrest has been folded forwards towards the seat surface;
a memory device with which the seat frame, when moving in the seat longitudinal direction, is stoppable automatically in an adjustable seat longitudinal position defined as a memory position;
a locking device of the memory device for locking a set memory position; and
a lever through which the locking device is coupled to the backrest,
wherein a movably mounted follower is provided which, with the backrest in the useful position, is held by a locking element in a position in which it acts on the memory device in the memory position of the seat so that the memory position is adjusted together with the seat frame when the seat longitudinal position is adjusted,
wherein locking device has a locking unit which is displaceable in the seat longitudinal direction and which defines the memory position at the same time;
wherein the locking unit is assigned a detent device which has in the seat longitudinal direction detent points arranged in succession and on which the locking unit can be locked relative to the detent device; and
wherein the locking unit comprises a pivotally mounted locking pawl which has a detent element which can engage on the detent points in the detent device.

34. A motor vehicle seat, comprising:
a seat frame;
a backrest which is pivotally mounted on the seat frame and which is foldable forwards from its useful position towards a seat surface of the seat frame;
a longitudinal guide with which the seat frame is movable in the seat longitudinal direction for adjusting the longitudinal position of the seat;
a fixing device for locking the seat frame in a previously adjusted seat longitudinal position;
an actuating element for releasing the fixing device so that the seat frame is movable in the seat longitudinal direction;
a coupling mechanism which acts on the actuating element and releases the fixing device when the backrest has been folded forwards towards the seat surface;
a memory device with which the seat frame, when moving in the seat longitudinal direction, is automatically stoppable in an adjustable seat longitudinal position defined as a memory position;
a locking device of the memory device for locking a set memory position; and
a lever through which the locking device is coupled to the backrest; wherein
a movably mounted follower is provided which with the backrest in the useful position is held by a locking element in a position in which it acts on the memory device in the memory position of the seat so that the memory position is adjusted together with the seat frame when the seat longitudinal position is adjusted, wherein the locking unit comprises a pivotally mounted locking pawl which has a detent element which can engage on the detent points in the detent device, and wherein the locking pawl is provided with a stop on which the follower acts when the backrest is located in a useful position so that the locking unit is entrained during adjustment of the seat longitudinal position.

35. The motor vehicle seat according to claim 34, wherein the stop is formed by at least one of a projection and an indentation.

36. The motor vehicle seat according to claim 34, wherein the locking unit comprises a pivotally mounted locking pawl which has a detent element which is engagable on the detent points in the detent device, and wherein the ramp is provided on the locking pawl.

37. A motor vehicle seat, comprising:
a seat frame;
a backrest which is pivotally mounted on the seat frame and which is foldable forwards from its useful position towards a seat surface of the seat frame;
a longitudinal guide with which the seat frame is movable in the seat longitudinal direction for adjusting the longitudinal position of the seat;
a fixing device for locking the seat frame in a previously adjusted seat longitudinal position;
an actuating element for releasing the fixing device so that the seat frame is movable in the seat longitudinal direction;
a coupling mechanism which acts on the actuating element and releases the fixing device when the backrest has been folded forwards towards the seat surface;
a memory device with which the seat frame when moving in the seat longitudinal direction is automatically stoppable in an adjustable seat longitudinal position defined as a memory position;
a locking device of the memory device for locking a set memory position; and
a lever through which the locking device is coupled to the backrest wherein a movably mounted follower is provided, which with the backrest in the useful position, is held by a locking element in a position in which it acts on the memory device in the memory position of the seat so that the memory position is adjusted together with the seat frame when the seat longitudinal position is adjusted, wherein the locking device has a locking unit which is displaceable in the seat longitudinal direction and which defines the memory position at the same time, and wherein the locking unit of the memory device is provided with a stop which is associated with at least a locking unit stop on the seat frame side which, during adjustment of the seat frame in the seat longitudinal direction from the memory position, entrains the locking unit when the locking unit is not completely locked, even if the follower is lifted from the memory device, and wherein the stop on the seat frame side locking unit no longer acts on the locking unit as soon as the locking unit is locked.

38. The motor vehicle seat according to claim 37, wherein the longitudinal guide is formed by two interengaging rails which include a hollow space between the two interengaging rails and wherein the structural assemblies of the memory device are disposed within this hollow space.

39. The motor vehicle seat according to claim 37, wherein the locking unit stop is provided on the locking pawl of the locking unit.

40. The motor vehicle seat according to claim 39, wherein the locking unit stop is brought out of engagement with the at least one stop on the seat frame side when the locking pawl engages by its detent hook in the associated detent opening.

41. The motor vehicle seat according to claim 37, wherein the locking unit is pretensioned towards the detent openings.

42. The motor vehicle seat according to claim 41, wherein the locking unit automatically engages in a next detent opening when the seat frame is moved in the seat longitudinal direction and the follower is lifted from the memory device.

* * * * *

UNITED STATES PATENT AND TRADEMARK OFFICE
CERTIFICATE OF CORRECTION

PATENT NO. : 7,172,249 B2  Page 1 of 1
APPLICATION NO. : 10/479305
DATED : February 6, 2007
INVENTOR(S) : Peter Rausch et al.

It is certified that error appears in the above-identified patent and that said Letters Patent is hereby corrected as shown below:

On the Title Page

(75) Inventors                Delete "Tsubmann",
                              Insert --Taubmann--

In the Claims

Column 19, line 12, Claim 26   After "forwards",
                               Insert --,--

Signed and Sealed this

Seventeenth Day of June, 2008

JON W. DUDAS
*Director of the United States Patent and Trademark Office*